United States Patent
Lee

(10) Patent No.: US 8,928,612 B2
(45) Date of Patent: Jan. 6, 2015

(54) MOBILE TERMINAL AND CONTROL METHOD THEREOF

(71) Applicant: LG Electronics Inc., Seoul (KR)

(72) Inventor: Jieun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 13/624,865

(22) Filed: Sep. 21, 2012

(65) Prior Publication Data

US 2013/0076674 A1 Mar. 28, 2013

Related U.S. Application Data

(60) Provisional application No. 61/537,506, filed on Sep. 21, 2011.

(30) Foreign Application Priority Data

Feb. 1, 2012 (KR) .......................... 10-2012-0010498

(51) Int. Cl.

| | | |
|---|---|---|
| *G06F 3/041* | (2006.01) | |
| *G06F 3/045* | (2006.01) | |
| *G06F 3/01* | (2006.01) | |
| *G06F 3/0485* | (2013.01) | |
| *H04M 1/725* | (2006.01) | |
| *G06F 3/0488* | (2013.01) | |

(52) U.S. Cl.
CPC .............. *G06F 3/041* (2013.01); *G06F 3/0485* (2013.01); *H04M 1/72561* (2013.01); *G06F 3/04883* (2013.01); *H04M 2250/22* (2013.01)
USPC ............................ 345/173; 345/174; 715/702

(58) Field of Classification Search
USPC ......................................................... 345/173
See application file for complete search history.

(56) References Cited

U.S. PATENT DOCUMENTS

2008/0036743 A1* 2/2008 Westerman et al. .......... 345/173

FOREIGN PATENT DOCUMENTS

| CN | 101308436 | 11/2008 |
|---|---|---|
| CN | 101398739 | 4/2009 |
| EP | 2302493 | 3/2011 |

OTHER PUBLICATIONS

The State Intellectual Property Office of the People's Republic of China Application Serial No. 201210449130.4, Office Action dated Dec. 26, 2013, 6 pages.

* cited by examiner

*Primary Examiner* — Charles V Hicks
(74) *Attorney, Agent, or Firm* — Lee, Hong, Degerman, Kang, & Waimey

(57) ABSTRACT

A mobile terminal capable of moving a page displayed on a display unit according to a touch input, and a control method thereof are provided. The mobile terminal including a display unit formed to allow for a touch input, includes a sensing unit configured to sense an object touched on the display unit and monitor a first movement of the object, and a controller configured to move a page displayed on the display unit according to a first ongoing direction, in response to a second movement of the object continued from the first movement, when the first movement corresponds to the first ongoing direction of the first movement and moves, while satisfying a pre-set reference within a reference region including a start point of the first movement.

23 Claims, 25 Drawing Sheets

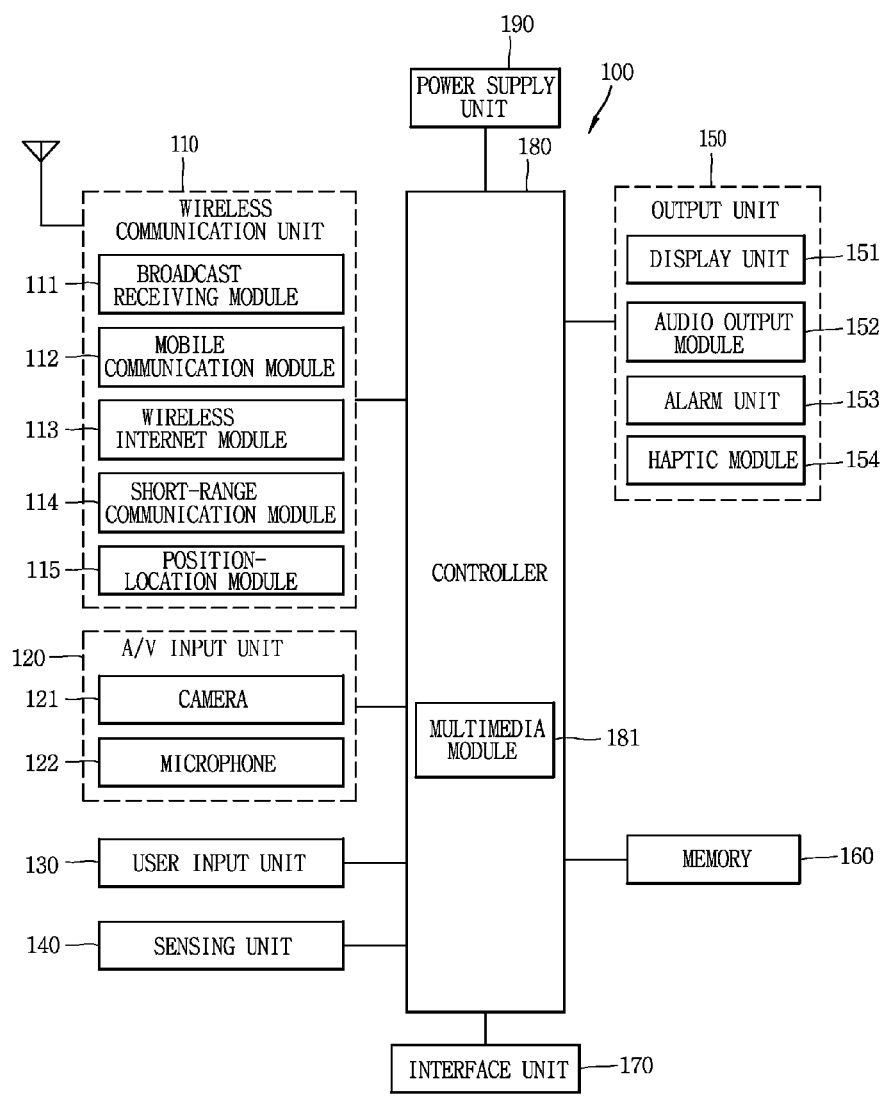

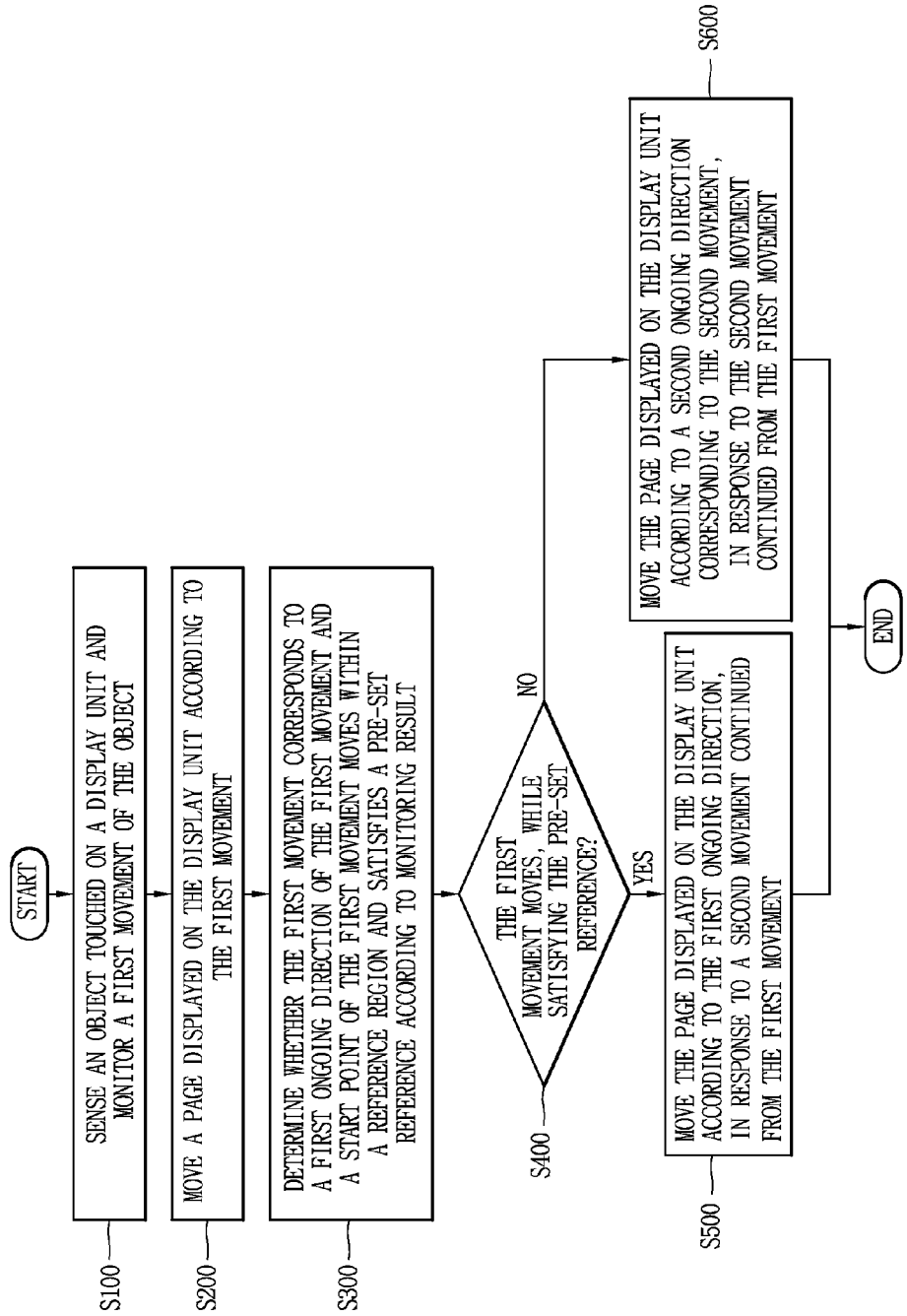

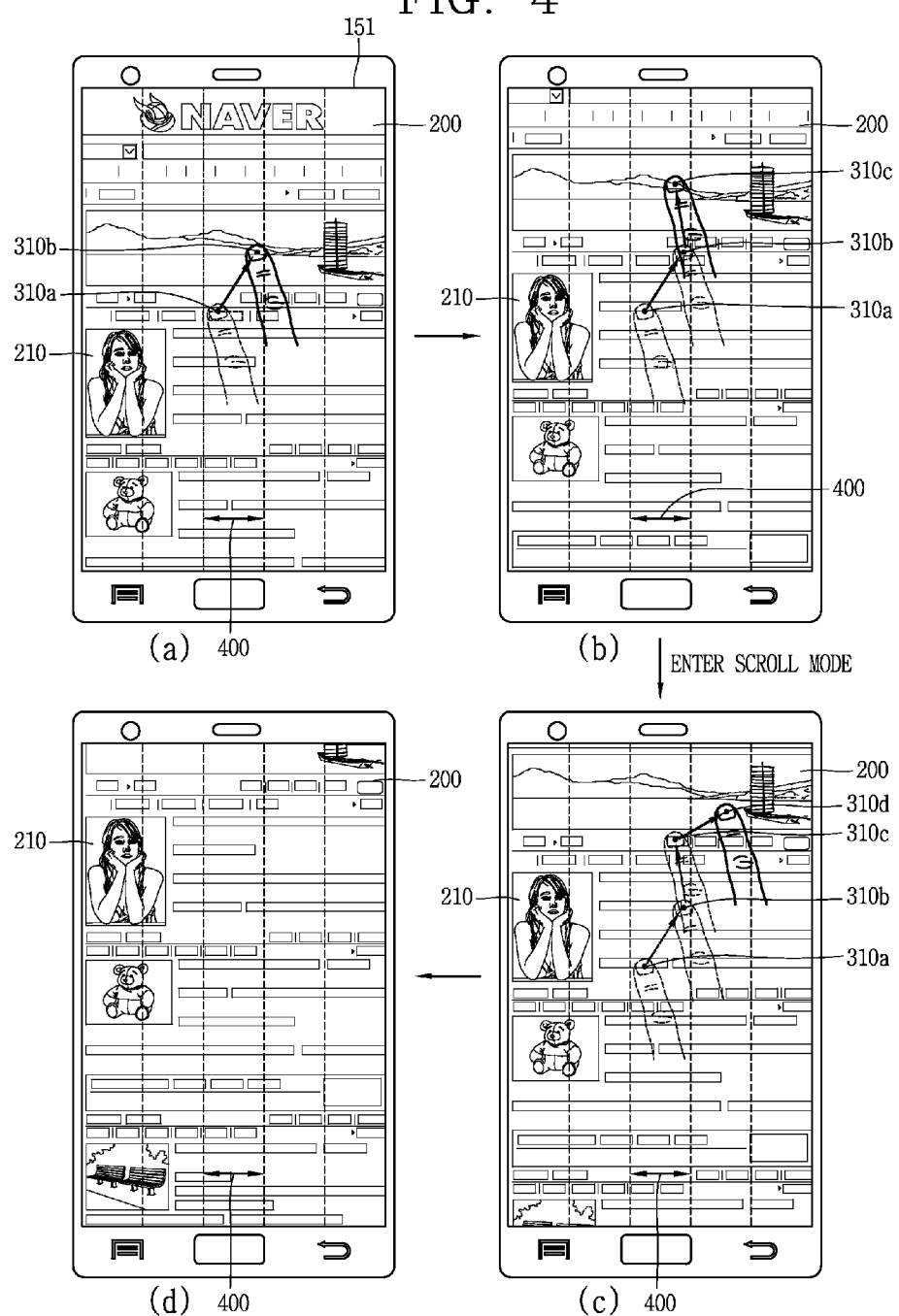

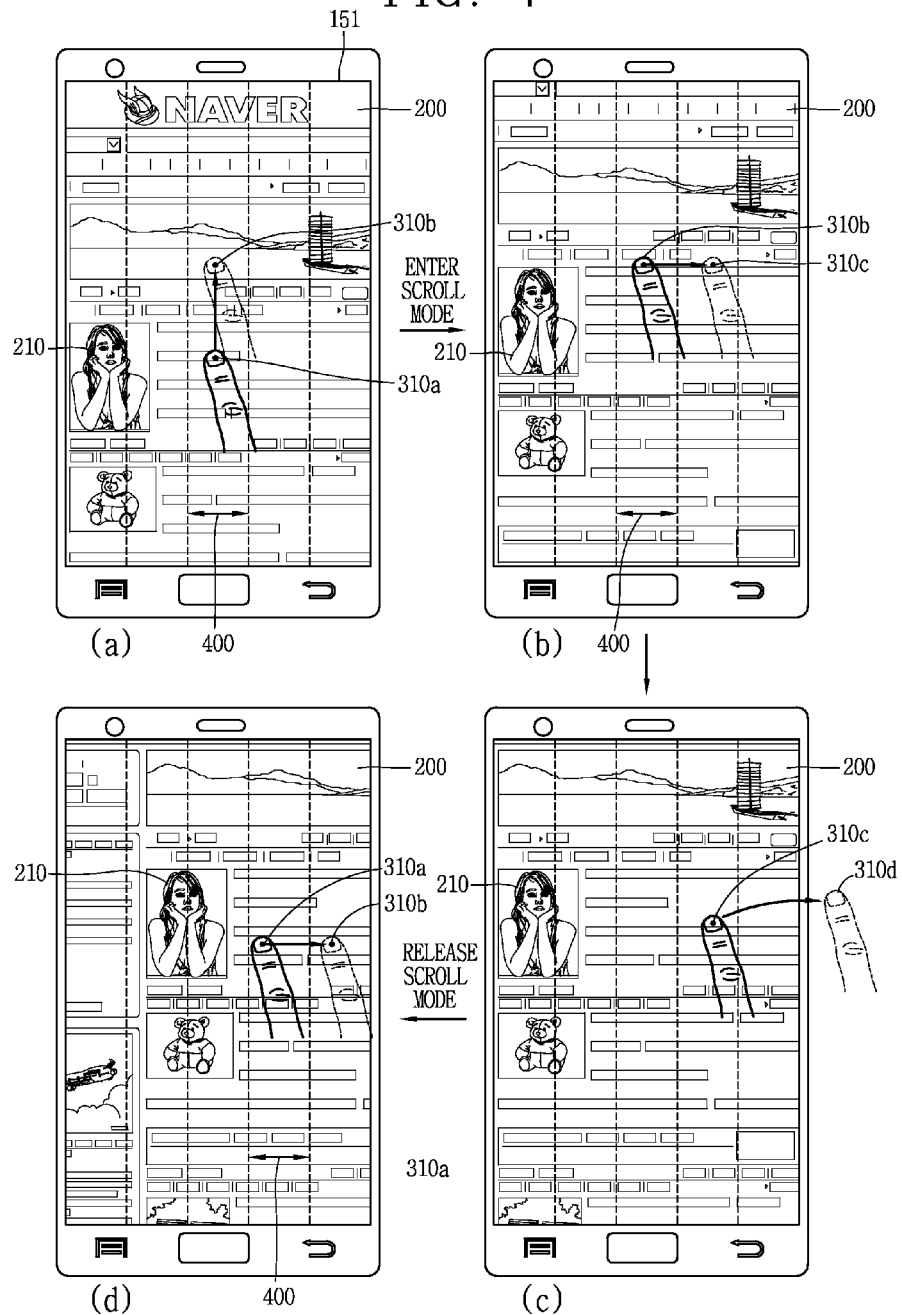

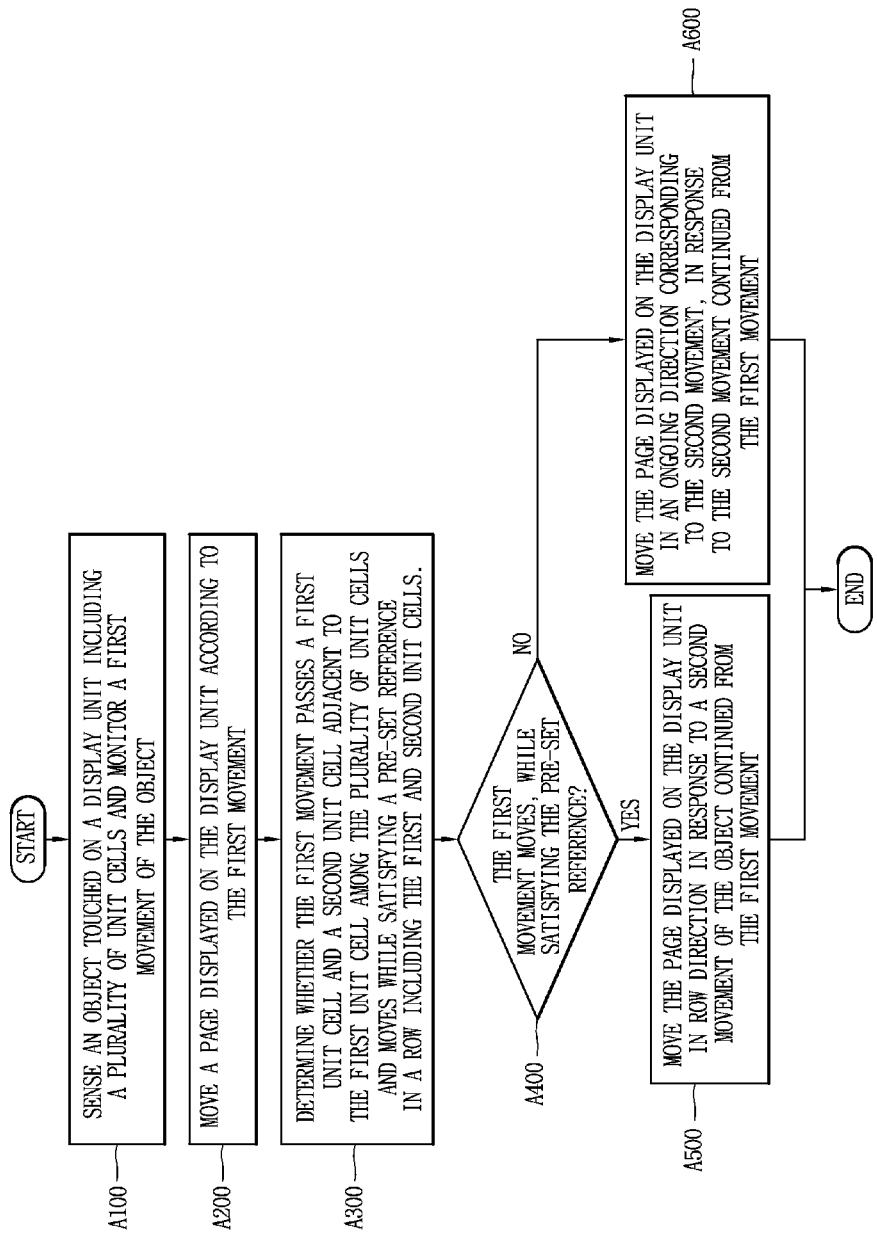

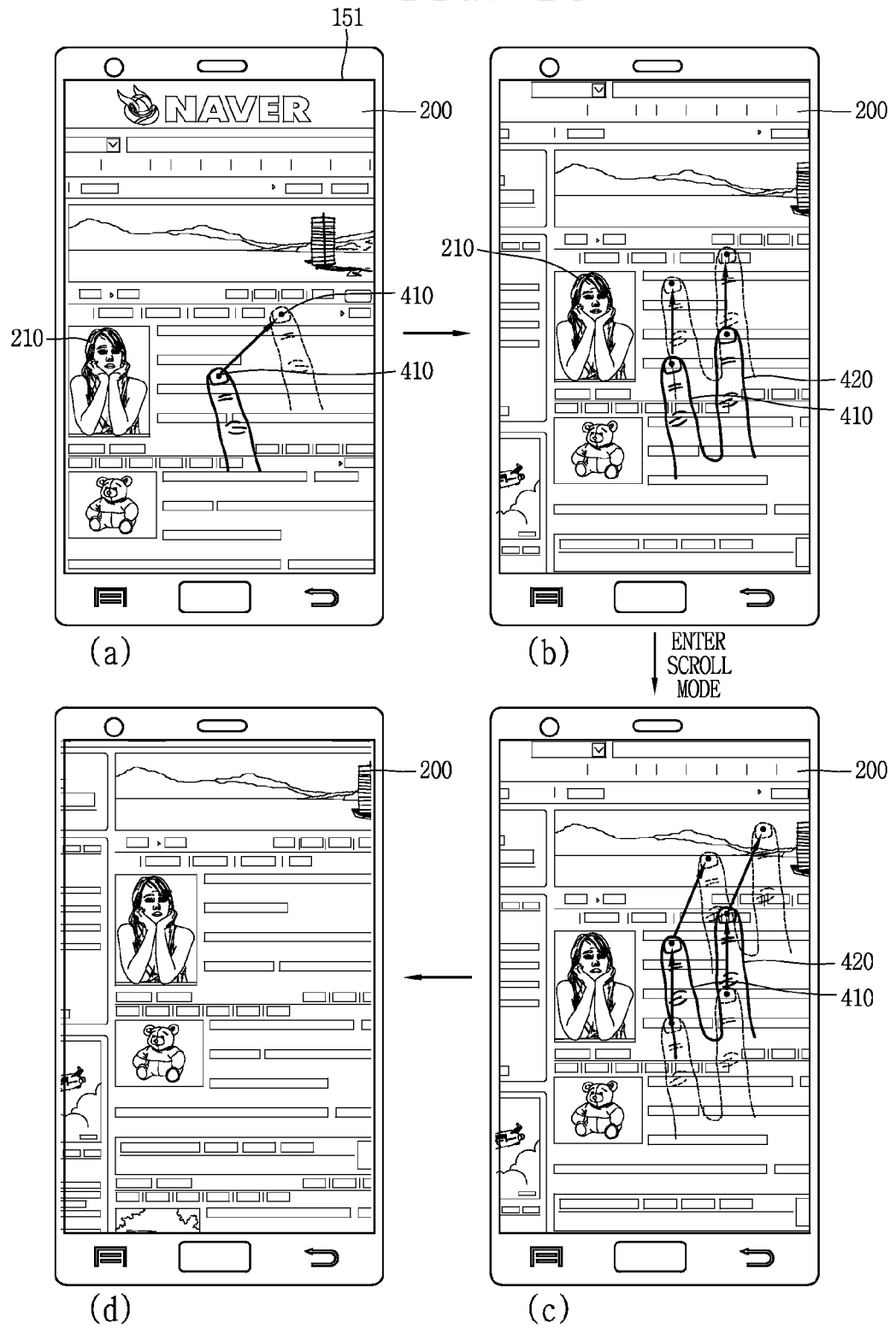

MOBILE TERMINAL AND CONTROL METHOD THEREOF

CROSS REFERENCE TO RELATED APPLICATIONS

Pursuant to 35 U.S.C. §119(e), this application claims the benefit of U.S. Provisional Application No. 61/537,506 filed on Sep. 21, 2011, and pursuant to 35 U.S.C. §119(a), also claims the benefit of earlier filing date and right of priority to Korean Application No. 10-2012-0010498 filed on Feb. 1, 2012, the contents of which are all hereby incorporated by reference in their entirety.

FIELD OF THE INVENTION

The present invention relates to a mobile terminal capable of moving a page displayed on a display unit, and a control method thereof.

DESCRIPTION OF THE RELATED ART

Mobile terminals may be configured to perform various functions. Such various functions include a data and voice communication function, a function of capturing an image or a video through a camera, a voice storage function, a function of playing or reproducing a music file through a speaker system, a function of displaying an image or a video, and the like. Some mobile terminal include an additional function of executing games, while some other mobile terminals may be implemented as a multimedia device. In addition, recently mobile terminals may receive broadcast or multicast signals to allow for viewing of a video or a television program.

In addition, efforts are ongoing to support and increase the functionality of mobile terminals. Such efforts include software and hardware improvements, as well as changes and improvements in the structural components which form mobile terminals.

Also, in a mobile terminal, an image displayed on a display unit may be moved based on a user's touch input. When an image displayed on a display unit is moved, in general, a touch input is applied by using a user's finger, or the like. However, when a touch input is applied by using a user's finger, since the screen of a display unit is so small and a touch sensor is so sensitive that an image may be occasionally moved in a direction different from that intended by the user. Thus, the necessity of a control method capable of moving an image in a direction intended by the user is required.

SUMMARY OF THE INVENTION

An aspect of the present invention is to provide a mobile terminal capable of predicting a direction in which a user wants to move an image by a touch input, and moving an image in the predicted direction, and a control method thereof.

Another aspect of the present invention is to provide a mobile terminal capable of providing relevant intuitional information to a user when a user's touch for moving an image is input but an image is not moved any longer.

According to an embodiment of the present invention, there is provided a mobile terminal including a display unit formed to allow for a touch input, including: a sensing unit configured to sense an object touched on the display unit and monitor a first movement of the object; and a controller configured to move a page displayed on the display unit according to a first ongoing direction, in response to a second movement of the object continued from the first movement, when the first movement corresponds to the first ongoing direction of the first movement and moves, while satisfying a pre-set reference within a reference region including a start point of the first movement.

In an embodiment, when the first movement satisfies the pre-set reference, the controller may activate a scroll mode in which the page displayed on the display unit is moved only in the first ongoing direction, in response to a movement of the object continued from the first movement.

In an embodiment, in the scroll mode, the controller may move the page displayed on the display unit according to the first ongoing direction, in response to the second movement moving in a second ongoing direction different from the first ongoing direction.

In an embodiment, even when the second movement moves out of the reference region, the controller may move the page displayed on the display unit according to the first ongoing direction.

In an embodiment, the scroll mode is released when the touch of the object with respect to the display unit is terminated.

In an embodiment, the first ongoing direction may be any one of a horizontal direction, a vertical direction, and a diagonal direction of the page.

In an embodiment, the first movement may correspond to a drag input of the object with respect to the display unit for moving the page displayed on the display unit, and when the first movement moves within the reference region and equal to or higher than a reference speed, the controller may move the page displayed on the display unit along the reference region in response to the first movement, and when the first movement moves within the reference region and lower than the reference speed, the controller may move the page displayed on the display unit in the drag direction in response to the first movement.

In an embodiment, the first ongoing direction may be a direction parallel to the reference region.

In an embodiment, the pre-set condition may be related to at least one of the number of touch events occurring according to the first movement, the reference speed, and a reference time.

In an embodiment, the controller may move the page displayed on the display unit in response to a movement of the object touched on the display unit, and when the page arrives at the edge thereof while the page is being moved, the controller may change a shape of the page based on the arrival of the edge of the page.

In an embodiment, the controller may tilt the page based on the edge region of the page, and display a first region beyond the edge of the page generated according to the tilting of the page.

In an embodiment, at least one of the number of different activated pages and information regarding content of the different pages may be displayed in the first region.

In an embodiment, when a touch of the object is terminated, the page having a changed shape may be restored into a shape before the page was changed in shape.

According to an embodiment of the present invention, there is also provided a mobile terminal including a display unit including a plurality of unit cells and formed to allow for a touch input, including: a sensing unit configured to sense an object touched on the display unit and monitor a first movement of the object; and a controller configured to move a page displayed on the display unit in a row direction in response to a second movement of the object continued from the first movement, when the first movement passes a first unit cell and a second unit cell adjacent to the first unit cell among the plurality of unit cells and moves, while satisfying a pre-set reference, within a row including the first and second unit cells according to the monitoring result.

In an embodiment, even when the object moves out of the row according to the second movement, the controller may move the page in the row direction in response to the second movement.

In an embodiment, the controller may move the page in an upward or downward direction or in a leftward or rightward direction based on the row direction according to an ongoing direction of the second movement.

In an embodiment, the pre-set reference may be associated with the number of unit cells, among the plurality of unit cells included in the same row, the object passes.

In an embodiment, the first movement may correspond to a drag input of the object with respect to the display unit for moving the page displayed on the display unit, and the controller may move the page to correspond to the drag direction, in response to the first movement.

In an embodiment, when the object corresponding to the drag input moves at a speed equal to or higher than a reference speed in the row, the controller may move the page in the row direction according to the first movement.

In an embodiment, a size of the unit cells may be changed according to a user setting.

According to an embodiment of the present invention, there is also provided a mobile terminal including: a display unit configured to allow for a touch input; a sensing unit configured to sense at least one of an object touched on the display unit; and a controller configured to move a page displayed on the display unit according to a first movement of a first object when the first object touched on the display unit is sensed by the sensing unit, activate a scroll mode when a second object different from the first object is sensed by the sensing unit and a second movement of the second object moves according to a pre-set reference, while maintaining a reference interval with respect to the first object, and move the page in a direction corresponding to an ongoing direction of the second movement, in response to a third movement in relation to at least one of the first and second objects.

According to an embodiment of the present invention, there is also provided a control method of a mobile terminal including a display unit formed to allow for a touch input, including: sensing an object touched on the display unit and monitoring a first movement of the object; moving a page displayed on the display unit according to the first movement; and when the first movement corresponds to a first ongoing direction of the first movement and moves, while satisfying a pre-set reference, within a reference region including a start point of the first movement, moving the page displayed on the display unit to correspond to the first ongoing direction, in response to the second movement of the object continued from the first movement.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 1 is a block diagram of a mobile terminal according to an embodiment of the present invention.

FIG. 3 is a flow chart illustrating a control method of a mobile terminal according to an embodiment disclosed in the present disclosure.

FIG. 4 is a conceptual view illustrating a method for entering a scroll mode in the mobile terminal according to an embodiment disclosed in the present disclosure.

FIG. 7 is a conceptual view illustrating a method for releasing a scroll mode in the mobile terminal according to an embodiment disclosed in the present disclosure.

FIG. 8 is a flow chart illustrating a control method of a mobile terminal according to another embodiment disclosed in the present disclosure.

FIG. 13 is a conceptual view illustrating a method for entering a scroll mode in the mobile terminal according to another embodiment disclosed in the present disclosure.

DETAILED DESCRIPTION

Figure 2A:
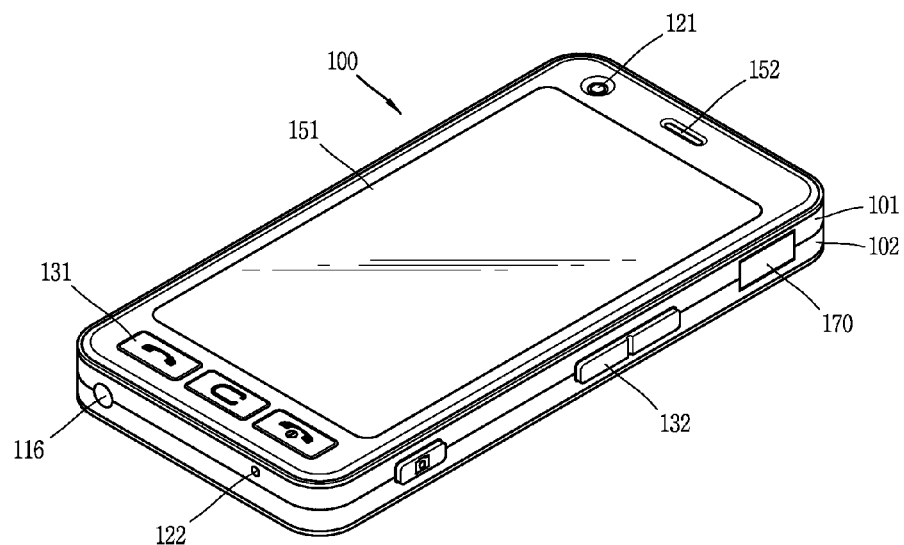
FIGS. 2A and 2B are front perspective view of an example of a mobile terminal according to an embodiment of the present invention.

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultra-books, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, when a state of the mobile terminal satisfies pre-set conditions, the controller 180 may execute a locked state for limiting an input of a control command of the user with respect to applications. Also, in a locked state, the controller may control a locked screen displayed on the locked state based on a touch input sensed through the display unit.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The mobile terminal according to an embodiment of the present invention described above with reference to FIG. 1, the mobile terminal in which components of the mobile terminal are disposed, or the structure of the mobile terminal will be described.

Figure 2B:
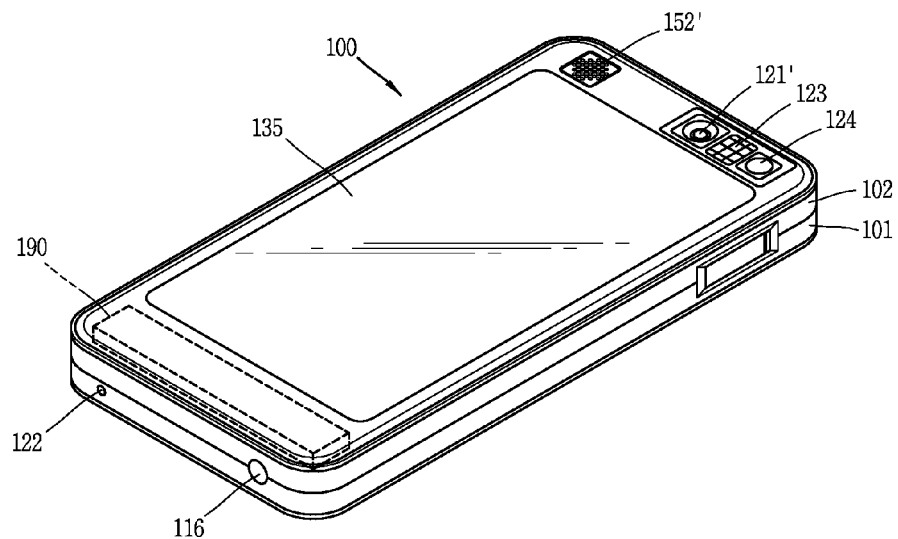

FIG. 2A is a front perspective view of the mobile terminal according to an embodiment of the present invention, and FIG. 2B is a rear perspective view of the mobile terminal illustrated in FIG. 2A.

The disclosed mobile terminal has a bar type terminal body. However, the present invention is not limited thereto and may be applicable to various structures such as a slide type mobile terminal, a folder type mobile terminal, a swing type mobile terminal, a swivel type mobile terminal, etc, in which two or more bodies are combined to be relatively movable.

As illustrated, the terminal body 100 (referred to as 'body', hereinafter) includes a front surface, a lateral surface, and a rear surface. Also, the body includes both ends formed in a length direction.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130/131, 132, the microphone 122, the interface unit 170, etc. may be disposed mainly on the front case 101 of the terminal body 100.

The display unit 151 occupies the most of a main surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102. The microphone 122 may be disposed on the other end of the body 100.

The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content inputted by the first and second manipulation units 131 and 132 can be variably set. For example, the first manipulation unit 131 may receive a command such as starting, ending, scrolling, etc., and the second manipulation unit 132 may receive a command such as controlling of the size of a sound outputted from the audio output unit 152 or conversion into a touch recognition mode of the display unit 151.

With reference to FIG. 2B, an audio output unit 152' may be additionally disposed on the rear surface of the terminal body. The audio output module 152' may implement stereophonic sound functions in conjunction with the audio output module 152 (See FIG. 2A) and may be also used for implementing a speaker phone mode for call communication.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151. In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

A camera 121' may additionally be disposed on the rear case 102 of the terminal body. The camera 121' may have an image capture direction which is substantially opposite to that of the camera 121 (See FIG. 2a), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to see himself when he wants to capture his own image (i.e., self-image capturing) by using the camera 121'.

An audio output unit 252' may be additionally disposed on the rear surface of the terminal body. The audio output unit 252' may implement a stereoscopic function along with the audio output module 22 (See FIG. 2A), and may be used for implementing a speaker phone mode during call communication.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such a touch pad 135 may be configured to be light-transmissive like the display unit 151. In this case, when the display unit 151 is configured to output visual information from both surfaces thereof, the visual information may be recognized also through the touch pad 135. The information output to the both surfaces of the display unit 151 may be controlled by the touch pad 135. Also, a display unit may be additionally mounted on the touch pad 135, so a touch screen may be displayed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

A mobile terminal including at least one or more of the components as described above may move a page output to the display unit 151 according to a movement of an object sensed by the sensing unit 140.

Hereinafter, a method for moving a page output to the display unit 151 will be described in conjunction with the controller 180, the sensing unit 140, the display unit 151, the user input unit 130, the memory 160, and the wireless communication unit 110.

First, the display unit 151 is formed to allow for a touch input. An object touched on the display unit 151 is sensed by the sensing unit 140.

When a touch of the object on the display unit 151 is sensed, the sensing unit 140 monitors (or tracks) a movement of the object until when the object is separated from the display unit 151, namely, until when the touch of the object is terminated.

Here, when the sensing unit 140 senses a capacitive touch, the object may be a user's finger, a capacitive touch pen, a stylus pen, or the like, and when the sensing unit 140 senses a resistive touch, the object may be a user's finger, a capacitive touch pen, a stylus pen, and any other various objects.

The controller 180 may move a page displayed on the display unit 151 according to a movement of the object monitored by the sensing unit 140.

Here, the page displayed on the display unit 151 may be a screen (or an image) corresponding to information selected through a touch input or the user input unit 130 with respect to the display unit 151.

The page may be a Web page, an e-book, a certain screen, a message screen, an electronic document stored in the memory 160, or may be a screen of various types of applications that may be executed in the mobile terminal.

Namely, the page represents a screen to which information displayed on the display unit 151 is output, and hereinafter, a screen displaying any one of the foregoing types of information will be defined as a 'page' for the description purpose.

Also, an amount of information included in the page is fixed, limiting the length of the page, and thus, the page includes a start and an end so there may be a boundary between the page and a region different from the page.

Meanwhile, a example of moving the page displayed on the display unit 151 will be described. When the user drags the display unit 151 to the right with his finger, the controller 180 may move the page displayed on the display unit to the right (or to the left according to a setting) according to a drag length sensed on the display unit 151.

Namely, the controller 180 may moves the page displayed on the display unit 151 in a direction corresponding to the direction of the movement of the object touched on the display unit 151 and by an amount corresponding to an extent of the movement (a length of movement) of the object.

Also, when the movement of the object satisfies pre-set conditions (a pre-set reference), the controller 180 may move the page displayed on the display unit 151 only in a pre-set direction, in response to a movement continued from the movement.

For example, when the movement of the object corresponds to a movement for scrolling the page in a vertical direction continuously, the controller 180 may recognize such a movement of the object, namely, a user intention, and continuously scroll the page in the vertical direction even when the movement of the object is not in a direction for moving the page vertically.

Here, scrolling refers to moving a page in a vertical direction or horizontal direction, according to which a new line including data included in information included in the page appears in an upper end or a lower end appears in an upper end or a lower end of the display unit 151 and data currently displayed on the screen is moved up or down line by line.

For example, when a page is scrolled in a downward direction (or in an upward direction according to a setting), a new line of the page appears on the lowermost portion of the screen and data which has been displayed on the page is moved up one line by one line and the uppermost line disappears so as not to be shown.

Scrolling in a vertical direction refers to scrolling in an upward or downward direction based on the position at which the terminal is placed, and scrolling in a horizontal direction refers to moving data in a lateral direction such as to the left or to the right based on the position at which the terminal is placed.

Meanwhile, as described above, the controller 180 may recognize a user intention for moving a page in any one direction through an initial movement of an object sensed by the sensing unit 140. When the initial movement of the object corresponds to a pre-set condition, the controller 180 may move the page in a direction corresponding to the initial movement, according to a different movement continued from the initial movement.

Meanwhile, in the present disclosure, for the description purpose, a case in which a movement of an object touched on the display unit 151 satisfies a pre-set condition so a page is moved only in a certain direction may be expressed such that the terminal has entered a 'scroll mode'.

In this manner, when the terminal has entered the 'scroll mode', the controller 180 may move the page in a direction corresponding to the initial movement of the object, namely, the movement satisfying the pre-set condition.

For example, when the initial movement of the object is a movement for moving the page in a vertical direction and the terminal enters the scroll mode according to the condition in which the initial movement was set, the controller moves the page only in the vertical direction although the movement of the object is in a horizontal direction, after the initial movement.

Meanwhile, in a state in which the object is touched on the display unit, when the object becomes away from the display unit (i.e., separated from the display unit), the scroll mode may be released.

Hereinafter, a movement of an object in order to make the terminal enter the scroll mode, namely, in order to activate the scroll mode will be described.

For example, when an object on the display unit 151 is touched and a movement of the object on the display unit 151 is monitored by the sensing unit 140, the controller 180 determines whether or not the object moves within a reference region.

When the movement of the object remains in the reference region, while satisfying a pre-set condition according to the determination result, the controller 180 activates the scroll mode.

For example, when the number of touch events within the reference region is equal to or greater than a pre-set number, when a length of the movement (a length of the touch) is equal to or greater than a pre-set length, or when a speed of the movement is equal to or higher than a pre-set speed, the controller 180 may activate the scroll mode. Here, the touch event is the number of touches sensed by the sensing unit 140.

The reference region may be a virtual region included in the display unit 151, and the display unit 151 may include a plurality of reference regions according to a user setting or a setting by the controller 180.

The reference regions may have a matrix structure (or checkerboard structure) that may include n number of rows and m number columns including a plurality of unit cells. Also, the reference region may be a quadrangular region having a reference interval based on a start point at which a touch of the object is started, and formed to correspond to a movement direction of the object.

In another example, in a state in which a first object is touched on the display unit 151 and the touch of the first object is maintained, when a touch of a second object different from the first object is sensed on the display unit 151, the sensing unit 140 monitors movements of the first and second objects.

When the first and second objects are simultaneously moved or any one of the first and second objects is moved and an interval between the first and second objects is uniformly maintained, the controller 180 may change the terminal to a scroll mode.

Here, the interval between the first and second objects may be an interval of a direction perpendicular to a direction in which at least one of the first and second objects moves.

As described above, when a movement of an object is sensed to satisfy a pre-set condition within a pre-set region or when an interval of an object is uniformly maintained, the controller may active the scroll mode.

Hereinafter a method for activating the scroll mode as described above will be described in more detail.

FIG. 3 is a flow chart illustrating a control method of a mobile terminal according to an embodiment disclosed in the present disclosure, and FIG. 4 is a conceptual view illustrating a method for entering a scroll mode in the mobile terminal according to an embodiment disclosed in the present disclosure.

An example of activating the scroll mode by the controller 180 will be described with reference to the flow chart of FIG. 3.

First, when an object touched on the display unit 151 (See FIG. 1) is sensed by the sensing unit 140 (See FIG. 1), the sensing unit 140 monitors a first movement of the object on the display unit (S100).

Here, the first movement is a movement of the object until when whether or not a condition for activating the scroll mode is met is determined, and a second movement described hereinafter is a movement of the object after whether or not the condition for activating the scroll mode is met is determined.

Also, here, the first movement and the second movement may be movements from a timing at which the object is "touched down" (the touch starts) on the display unit 151 to a timing at which it is "touched up" (the touch is released) from the display unit 151.

Referring to FIG. 4(*a*), with a page 200 displayed on the display unit 151, when the user's finger (referred to as an 'object', hereinafter) touches the display unit 151, the sensing unit 140 monitors a first movement of the object.

The controller 180 moves the page displayed on the display unit 151 in a direction corresponding to the first movement of the object (S200, See FIG. 3).

Referring to FIG. 4(*a*), when the object moves from a first point 310*a* to a second point 320*b* within a reference region 400, as shown in FIG. 4(*b*), the controller moves the page in a direction corresponding to the first and second points.

Here, the reference region 400 may be a pre-set fixed region on the display unit 151 before the object is touched, or may be a region set based on a point where the object is touched. When the reference region is set after the object is touched, the reference region is set to have a pre-set reference interval based on the point where the object was touched.

As illustrated in FIG. 4(*a*), the reference region is formed in a direction corresponding to the movement of the object, and when the object moves horizontally, rather than vertically, as shown in FIG. 4(*a*), the reference region may be formed in a horizontal direction.

Also, when the object moves within the reference region 400, although the movement of the object is not in a straight line, the controller 180 may determine that the user intends to move the page in a 'vertical direction', and moves the page only in the vertical direction.

Also, when a movement speed of the object within the reference region is equal to or higher than a pre-set speed, the controller 180 may move the page in only one direction, regardless of movement directions of the object.

For example, when the object has a speed equal to or higher than the pre-set speed and moves only in a vertical direction within the reference region, the controller 180 may consider only the movement in the vertical direction, without consideration of a movement in a horizontal direction.

Thus, in FIG. 4(*a*), when the object moves from the first point 310*a* to the second point 310*b* in a diagonal direction within the reference region 400, the controller 180 may recognize it as a movement in a vertical direction and moves the page 200 only in the vertical direction (See the movement of the image 210 included in the page) as shown in FIG. 4(*b*).

According to the monitoring results, the controller 180 determines whether or not the first movement of the object corresponds to a first ongoing direction of the first movement and moves, while satisfying a pre-set reference, within the reference region including a start point of the first movement (S300).

Here, the first ongoing direction of the first movement is a direction corresponding to an initial movement of the object, and in the illustration of FIG. 4(*a*), the direction from the first point 310*a* to the second point 320*b* may be the first ongoing direction, and here, the first ongoing direction may be a vertical direction unless a movement in a horizontal direction within the reference region is counted.

As shown in FIG. 4(*b*), the controller 180 determines whether or not the object, after moving from the first point 310*a* to the second point 310*b*, continuously moves within the reference region 400 until when the pre-set reference is satisfied.

Here, the pre-set reference may be variously set. Namely, the pre-set reference may include i) a length of a movement (a length of the touch) of the object within the reference region, ii) whether or not the object has moved a pre-set distance within a pre-set time, iii) the number of touch events occurring within a pre-set time, and iv) whether or not the object has moved a pre-set distance while maintaining a speed equal to or higher than a pre-set speed, and the like.

Namely, the controller 180 determines what kind of movement the object makes within the "reference region" (namely, the controller 180 determines a type of a movement of the object within the "reference region").

According to the determination, when the first movement of the object moves, while satisfying the pre-set reference (S400, See FIG. 3), the controller 180 moves the page displayed on the display unit according to the first ongoing direction of the first movement, in response to the second movement continued from the first movement (S500, See FIG. 3).

Meanwhile, according to the determination, when the first movement of the object does not move to satisfy the pre-set reference (S400, See FIG. 3), the controller 180 moves the page displayed on the display unit in a direction corresponding to the ongoing direction of the second movement, in response to the second movement continued from the first movement.

Namely, when the first movement satisfies the pre-set reference, although the ongoing direction of the second movement continued from the first movement is different from the first movement, the controller 180 moves the page in the ongoing direction of the first movement, in response to the second movement.

For example, even when the ongoing direction of the first movement is a vertical direction and that of the second movement is a horizontal direction, the controller 180 moves the page in the vertical direction, i.e., the ongoing direction of the first movement, in response to the second movement.

For example, referring to FIG. 4(*b*), when the pre-set condition is satisfied while the object is moving from the first point 310*a* to the second point 310*b* and from the second point 310*b* to the third point 310*c* within the reference region 400, the controller 180 activates the scroll mode.

Thus, as shown in FIG. 4(*c*), when the movement from the third point 310*c* to the fourth point 310*d* is out of the reference region 400, the controller 180 may move the page 200 in a direction (vertical direction) corresponding to the reference region 400, as shown in FIG. 4(*d*).

Namely, although the movement from the third point 310*c* to the fourth point 310*d* is different from the ongoing direction from the first point to the third point (310*a*→310*b*→310*c*), the controller 180 moves the page 20 in the same direction (vertical direction) as the ongoing direction from the first point to the third point (310*a*→310*b*→310*c*).

Here, the movement from the first point to the third point (310*a*→310*b*→310*c*) may be considered as a 'first movement', and the movement from the third point to fourth point (310*b*→310*d*) may be considered as a 'second movement'.

As discussed above, in the mobile terminal according to an embodiment of the present disclosure, a direction the user wants to move a page in is predicted, and although a touch in a direction different from the predicted direction is input, a page is moved only in the predicted direction, whereby the page can be moved according to a user intention in spite of a touch in an erroneous direction.

Hereinafter, a movement of a page in the scroll mode will be described in detail with reference to FIGS. 5A, 5B, 6A, 6B, and 7.

Figure 5A:
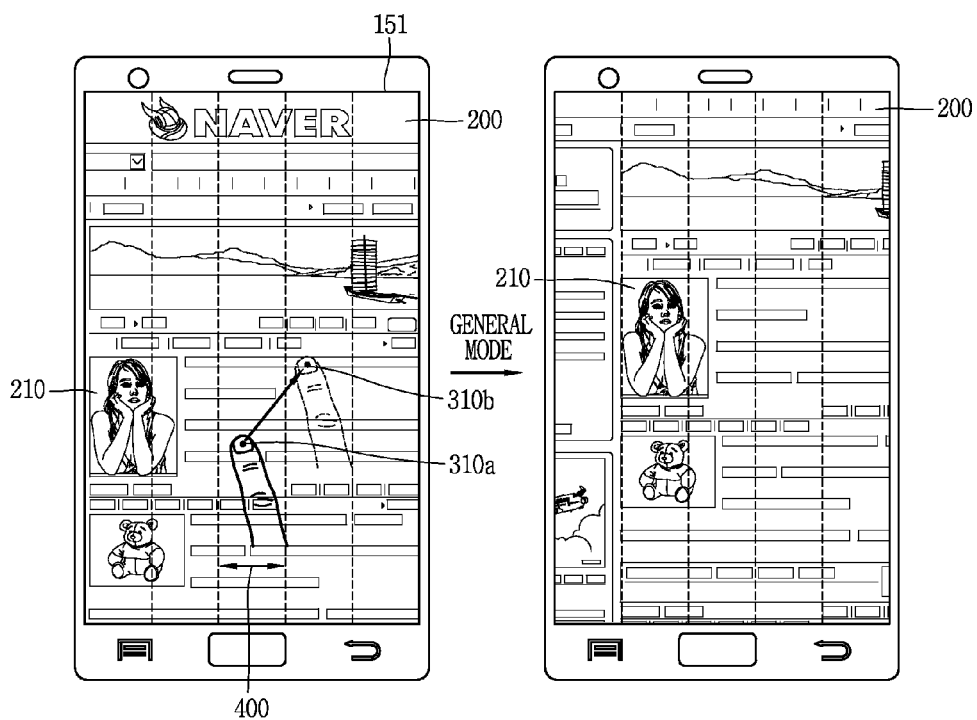
FIGS. 5A and 5B are conceptual views illustrating a difference between a scroll mode and a normal mode in the mobile terminal according to an embodiment disclosed in the present disclosure.
Figure 5B:
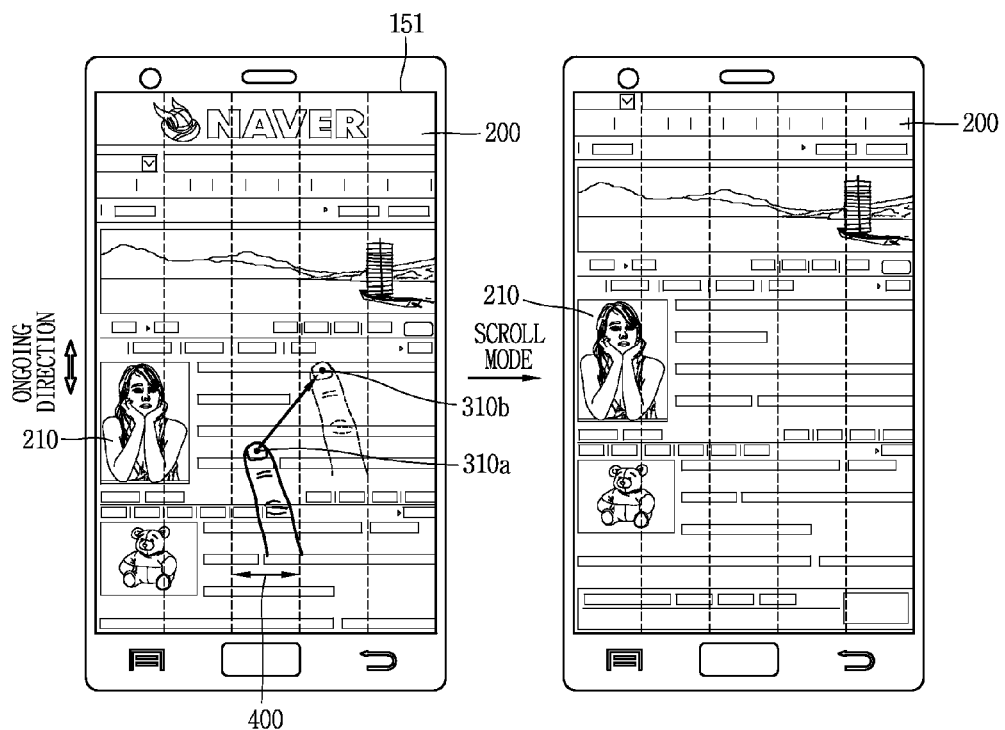

FIGS. 5A and 5B are conceptual views illustrating a difference between a scroll mode and a normal mode in the mobile terminal according to an embodiment disclosed in the present disclosure.

First, in a normal mode, the controller 180 moves a page displayed on the display unit in a direction corresponding to a movement direction of an object, and in a scroll mode, the controller 180 moves the page displayed on the display unit in a direction set when entering the scroll mode, regardless of a movement direction of the object.

For example, as shown in FIG. 5A, when a touch of an object is sensed at a first point 310a on the display unit and the object is moved (or dragged) to a second point 310b, the controller 180 moves the page 200 displayed on the display unit in a right diagonal direction in response to the movement of the object.

In this manner, in the normal mode, the controller 180 moves the page 200 in the same direction as the movement direction of the object (or in a direction opposite to the movement direction of the object according to a setting).

Meanwhile, as shown in FIG. 5B, in the scroll mode set to move a page in a vertical direction, although the object is touched on the first point 310a of the display unit 151 and moves in the right diagonal direction, rather than in the vertical direction, beyond the reference region 400, the controller 180 moves the page 200 in the vertical direction.

Namely, in the scroll mode, although the movement of the object gets out of the reference region 400 or the movement of the object is in a direction not identical to a pre-set ongoing direction, the controller 180 always moves the page 200 only in the pre-set ongoing direction.

Next, an embodiment of moving a page in response to a movement in a second direction when the scroll mode in which the page is scrolled in a first direction is activated and a movement of an object in the second direction is sensed will be described with reference to FIGS. 6A and 6B.

Figure 6A:
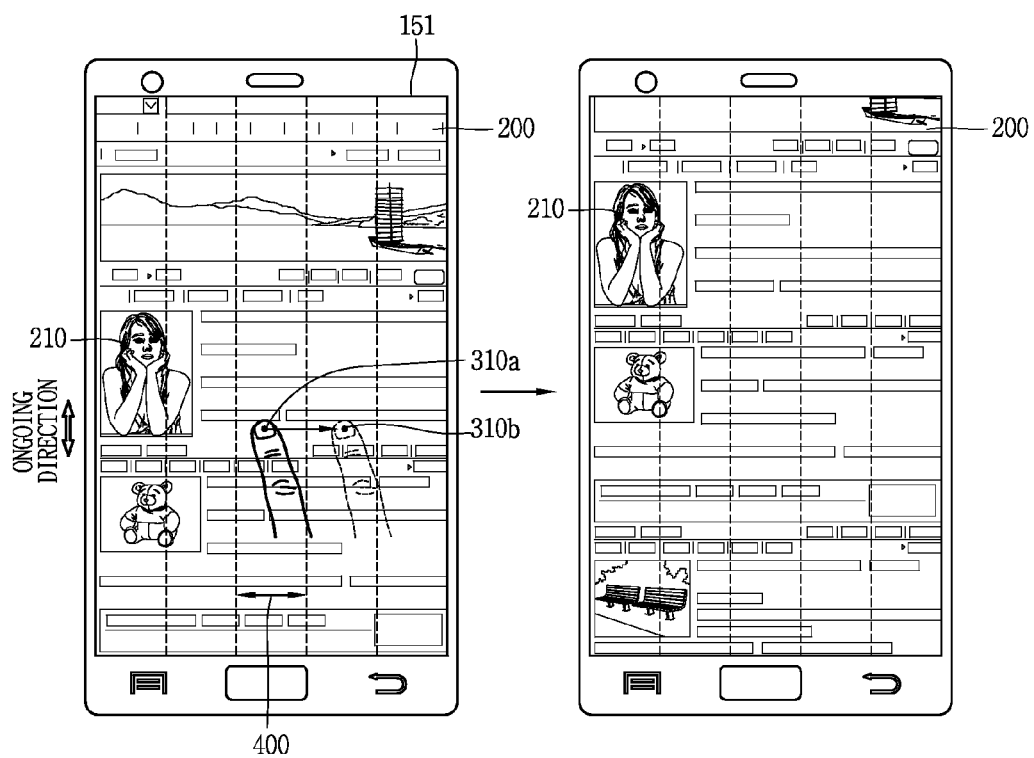
FIGS. 6A and 6B are conceptual views illustrating a method for moving a page in the mobile terminal according to an embodiment disclosed in the present disclosure.
Figure 6B:
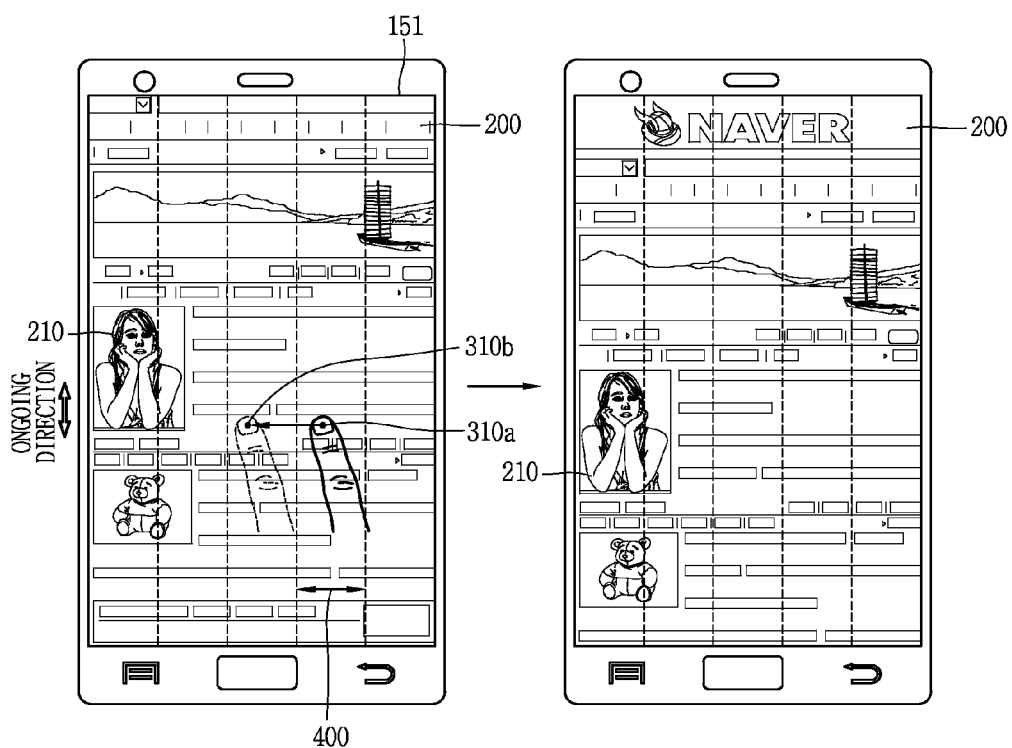

FIGS. 6A and 6B are conceptual views illustrating a method for moving a page in the mobile terminal according to an embodiment disclosed in the present disclosure.

For example, in a state in which the scroll mode for moving the page 200 in a vertical direction with respect to a movement of an object, although the object moves in a horizontal direction, the controller 180 moves the page 200 in a vertical direction.

Meanwhile, the controller 180 may move the page up or down according to whether or not the movement of the object corresponding to a horizontal direction is to the right or left.

For example, as illustrated in FIG. 6A, with the scroll in a vertical direction activated, when the object moves rightwardly from the first point 310a to the second point 310b, the controller 180 may move up page 200.

Similarly, as illustrated in FIG. 6B, with the scroll in a horizontal direction activated, when the object moves leftwardly from the first point 310a to the second point 310b, the controller 180 may move down the page 200.

Also, contrary to the description with reference to FIGS. 6A and 6B, the page may be moved down in response to a rightward movement of the object, or the page may be moved up in response to a leftward movement of the object, and a setting of such directions may be variously changed by the user or the controller 180.

An embodiment of releasing an activated scroll mode will be described with reference to FIG. 7.

FIG. 7 is a conceptual view illustrating a method for releasing a scroll mode in the mobile terminal according to an embodiment disclosed in the present disclosure.

A scroll mode may be released when a touch of an object with respect to the display unit 151 is terminated.

As illustrated in FIG. 7(a), when the object (user's finger) touched on the display unit 151 moves from the first point 310a to the second point 310b within the reference region 400, the condition for activating the scroll mode is met, the scroll mode is activated.

As illustrated in FIG. 7(b), in the vertically set scroll mode, the page 200 is moved in the vertical direction as shown in FIG. 7(c) in response to the movement of the object in the horizontal direction from the second point 310b to the third point 310c.

In FIG. 7(c), when the touch with respect to the display is terminated at the point 310c, namely, when the object is removed (touch up) from the third point 310c of the display unit and moves to an external fourth point 310d outside the display unit 151, the controller 180 deactivates the scroll mode.

As illustrated in FIG. 7(d), in a state in which the scroll mode for moving the page in the vertical direction is deactivated, when the object is touched on the first point 310a of the display unit 151 and moves from the first point 310a to the second point 310b in a horizontal direction, the controller 180 moves the page in a direction corresponding to the movement direction of the object.

Namely, when the touch of the object on the display unit 151 is terminated in the state in which the scroll mode is activated, the controller 180 releases the scroll mode and moves the page in a direction corresponding to the movement direction of the object.

In the above, the method in which the reference region has an interval set based on a point at which a touch of the object is sensed, and the scroll mode is activated in response to a movement of the object within the reference region having a space in a direction corresponding to the movement direction of the object has been described.

Hereinafter, a method for activating a scroll mode within a reference region having a format (or structure) different from the reference region as mentioned above will be described.

Figure 9:
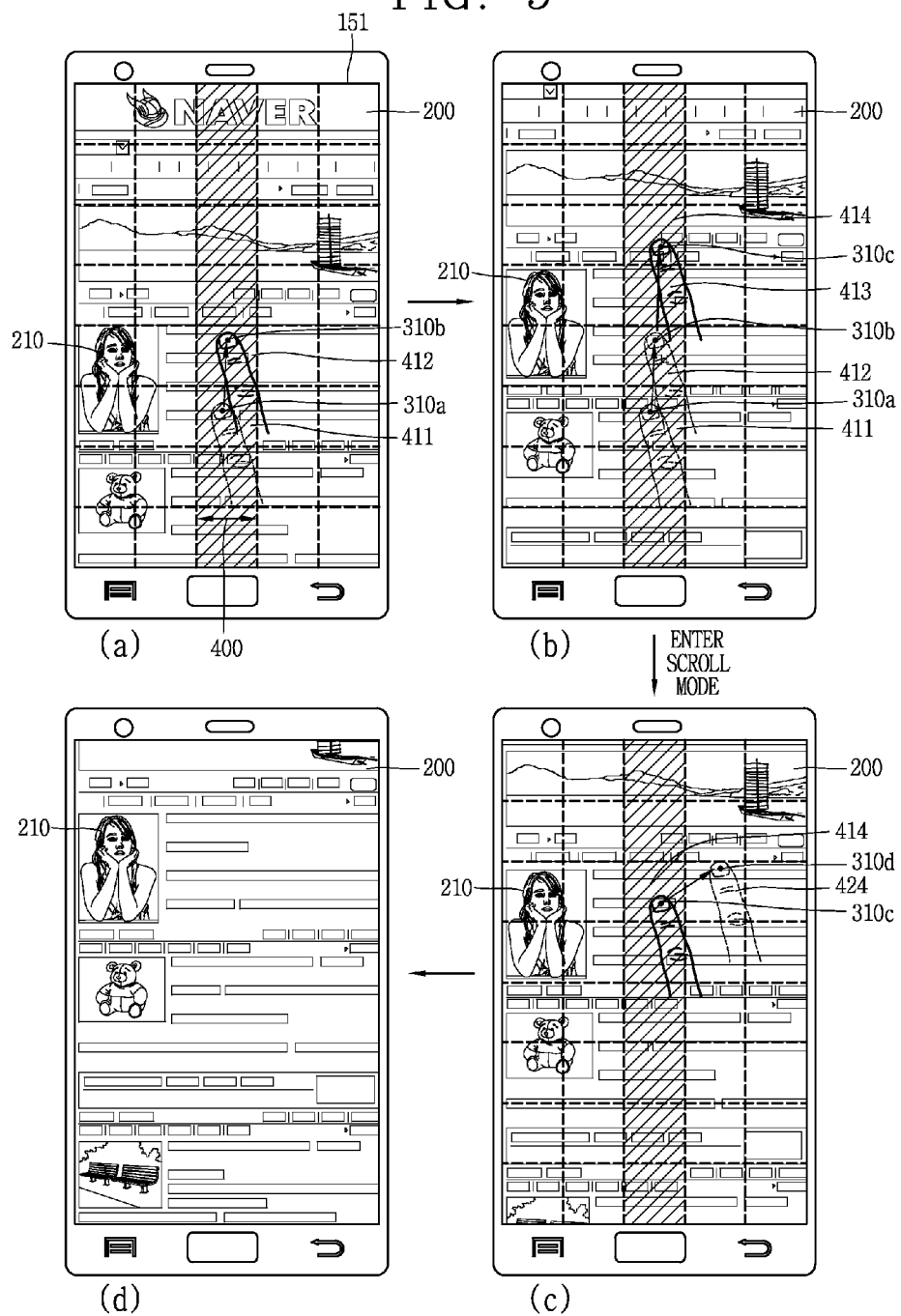
FIG. 9 is a conceptual view illustrating a method for entering a scroll mode in mobile terminal according to another embodiment disclosed in the present disclosure.

FIG. 8 is a flow chart illustrating a control method of a mobile terminal according to another embodiment disclosed in the present disclosure, and FIG. 9 is a conceptual view illustrating a method for entering a scroll mode in mobile terminal according to another embodiment disclosed in the present disclosure.

An example for activating a scroll mode by the controller 180 will be described with reference to the flow chart of FIG. 8.

First, the sensing unit 140 senses an object touched on the display unit 151, and monitors a first movement of the sensed object (A100).

Here, the first movement is a movement of the object until when whether or not a condition for activating the scroll mode is met is determined, and a second movement described hereinafter is a movement of the object after whether or not the condition for activating the scroll mode is met is determined.

Also, here, the first movement and the second movement may be movements from a timing at which the object is "touched down" (the touch starts) on the display unit 151 to a timing at which it is "touched up" (the touch is released) from the display unit 151.

Referring to FIG. 9(*a*), as for a unit cell, the display unit 151 may be divided into a plurality of cells each having a certain size.

Namely, the display unit 151 may have a matrix structure having n rows×m columns. The size and number of unit cells included in the display unit 151 may be changed according to a user setting, and may be appropriately changed according to a size of the display unit 151 by the controller 180.

The controller 180 may activate the scroll mode based on a movement of a touch sensed in the unit cells included in the same row (or the same column).

Hereinafter, a row (or column) of a unit cell on which a touch is sensed and a unit cell on which a different touch continued from the touch is sensed will be referred to equally as a 'row', rather than discriminating them as a 'row or column'.

Namely, as illustrated in FIG. 9(*a*), a column including a first unit cell 411 and a second unit cell 412 will be referred to as a 'row' including the first unit cell 411 and the second unit cell 412.

Meanwhile, when a first movement of the object is monitored in step A100, the controller 180 moves the page in response to the first movement (A200).

For example, as illustrated in FIG. 9(*a*), when a touch of an object is sensed at the first point 310*a* in the first unit cell 411 and the object moves, passing a boundary line of the first unit cell 411, to the second point 310*b* of the second unit cell 412, the controller 180 moves up the page 200 in a first row (400) direction as shown in FIG. 9(*b*).

When the object moves within the first row 400, although the movement of the object is not in a straight line, the controller 180 may determine that the user wants to move the page in a 'vertical direction', and move the page only in the vertical direction.

Also, when a movement speed of the object is equal to or higher than a pre-set speed within the first row 400, the controller 180 may move the page in only one direction regardless of movement directions of the object.

For example, when the object has a speed equal to or higher than the pre-set speed and moves only in a vertical direction within the first row 400, the controller 180 may consider only the movement in the vertical direction, without consideration of a movement in a horizontal direction.

By using the monitoring results with respect to the movement of the object sensed by the sensing unit, the controller 180 determines whether or not the first movement of the object moves to pass the first unit cell and the second unit cell adjacent to the first unit cell, among a plurality of unit cells, while satisfying the pre-set reference within the row including the first and second unit cells (A300).

For example, as illustrated in FIG. 9(*b*), whether or not the object moves from the first point 310*a* to the second point 310*b* within the first row 400 and continues to move within the reference region 400 until when the object satisfies a pre-set reference.

Here, the pre-set reference may various set. Namely, the pre-set reference may include i) the number of cells the object passes in the same row, ii) whether or not the object has passed a pre-set number of cells within a pre-set time, iii) a length of a movement (or a length of a touch) in the row, iv) whether or not the object has moved a pre-set distance within a pre-set time, v) the number of touch events which has occurred within a pre-set time, and vi) whether or not the object has moved a pre-set distance, while maintaining a speed equal to or higher than a pre-set speed.

Namely, the controller 180 determines a type of a movement of the object within the "row".

According to the determination, when the first movement of the object moves, while satisfying the pre-set reference (A400, See FIG. 8), the controller 180 moves the page displayed on the display unit according to the first row direction, in response to the second movement continued from the first movement (A500).

Meanwhile, according to the determination, when the first movement of the object does not move to satisfy the pre-set reference (A400, See FIG. 8), the controller 180 moves the page displayed on the display unit in a direction corresponding to the ongoing direction of the second movement, in response to the second movement continued from the first movement.

Namely, when the first movement satisfies the pre-set reference, although the ongoing direction of the second movement continued from the first movement is different from the first row direction, the controller 180 moves the page in the first row direction, in response to the second movement.

For example, as illustrated in FIG. 9(*b*), when the first movement of the object, passing the first unit 411 and the second unit cell 412 adjacent to the first unit cell 411, moves within the row including the first and second unit cells 411 and 412, while satisfying a pre-set condition, the controller 180 activates the scroll mode.

In the state in which the scroll mode is activated, as illustrated in FIG. 9(*c*), when the object moves to a different row adjacent to the first row 400 from the third point 310*c* of the unit 414 of the first row 400 (a second movement), the controller 180 moves the page 200 in the direction of the first row 400, regardless of the direction of the second movement.

As discussed above, in the mobile terminal according to an embodiment of the present invention disclosed in the present disclosure, a direction the user wants to move a page is predicted, and although a touch in a direction different from the predicted direction is input, the page is moved only in the predicted direction, whereby the page can be moved according to a user intention in spite of a touch in an erroneous direction.

Hereinafter, a method for setting a row in case that whether or not an object moves, while satisfying a pre-set condition within any of a plurality of rows is determined will be described with reference to FIGS. 10A and 10B.

Figure 10A:
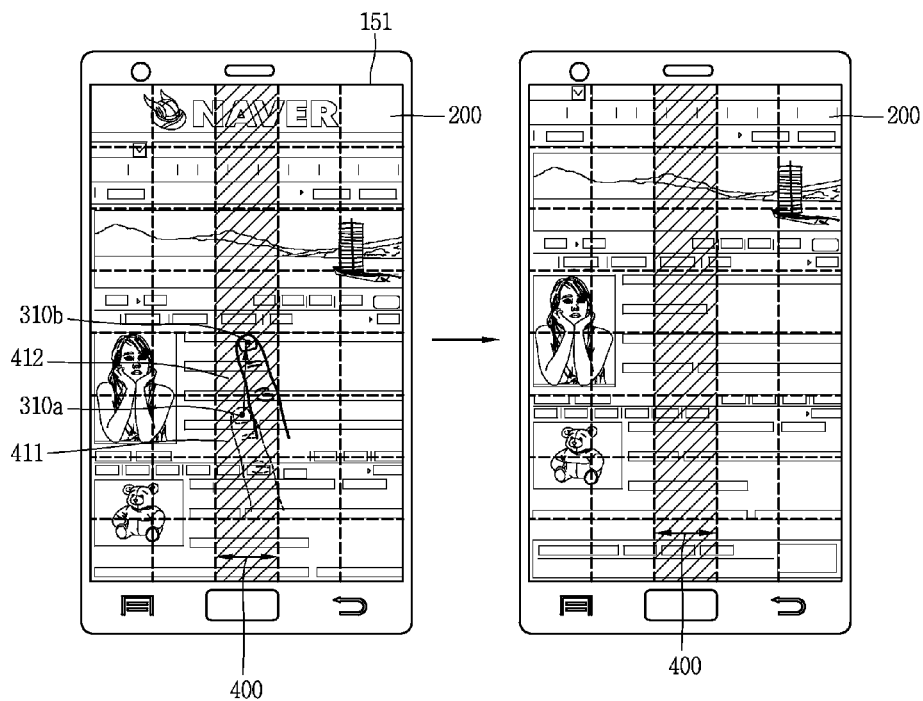
FIGS. 10A and 10B are conceptual views illustrating a method for setting a region in the mobile terminal according to another embodiment disclosed in the present disclosure.
Figure 10B:
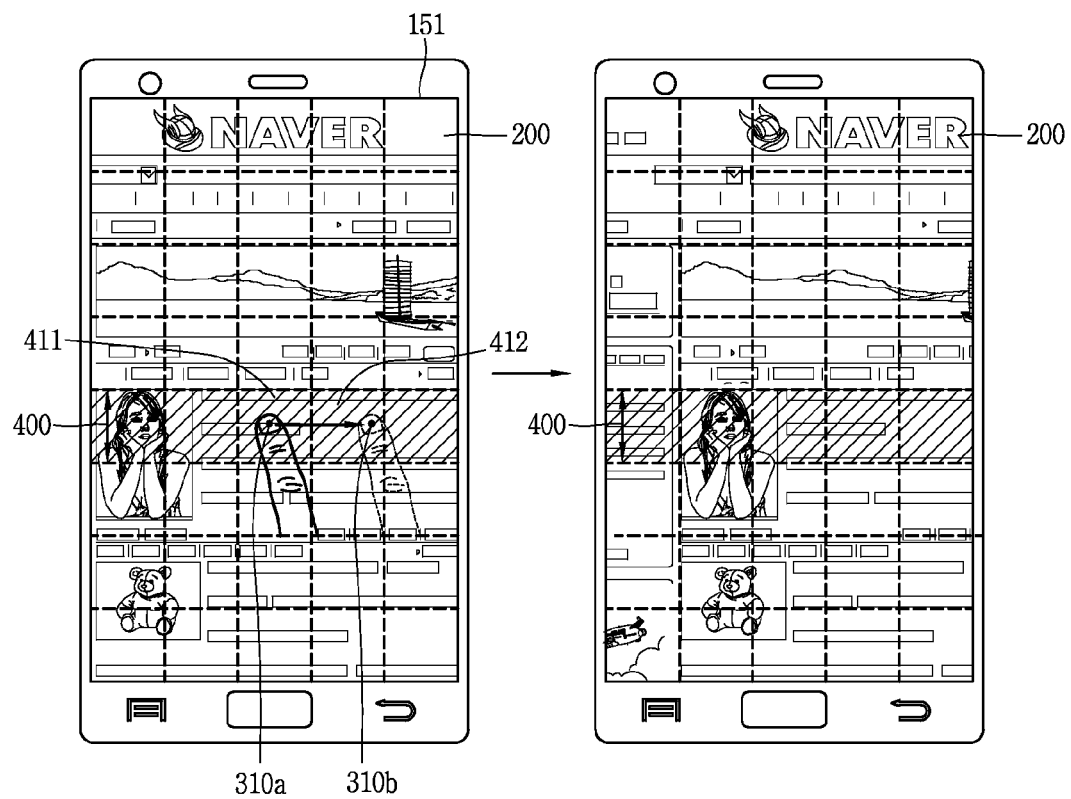

FIGS. 10A and 10B are conceptual views illustrating a method for setting a region in the mobile terminal according to another embodiment disclosed in the present disclosure.

The controller 180 sets a 'row' including a unit cell corresponding to a point of the display unit 151 at which an object is touched and a unit cell corresponding to a point to which the object has moved from the touched point, as a row monitored to determine whether or not the object moves within the row, while satisfying the pre-set condition.

For example, as illustrated in FIG. 10A, when the object moves in a vertical direction from the first unit cell 411 to the second unit cell 412 on the display unit 151, the controller 180 sets the first row 400 as a 'reference row' including the first and second unit cells 411 and 412, and determines whether or not a movement of the object within the 'reference row' satisfies the pre-set reference.

Also, as illustrated in FIG. 10B, when the object moves in a horizontal direction from the first unit cell 411 to the second unit cell 412 on the display unit 151, the controller 180 sets the first row 400 including the first and second unit cells 411 and 412, as a 'reference row', and determines whether or not a movement of the object within the 'reference row' satisfies a pre-set reference.

As discussed above, the controller 180 variously changes the reference row according to a movement of the object.

Hereinafter, a method for moving a page in response to an initial movement of an object, before a movement of the object within a reference row satisfies a pre-set condition, will be described with reference to FIGS. 11A and 11B.

Figure 11A:
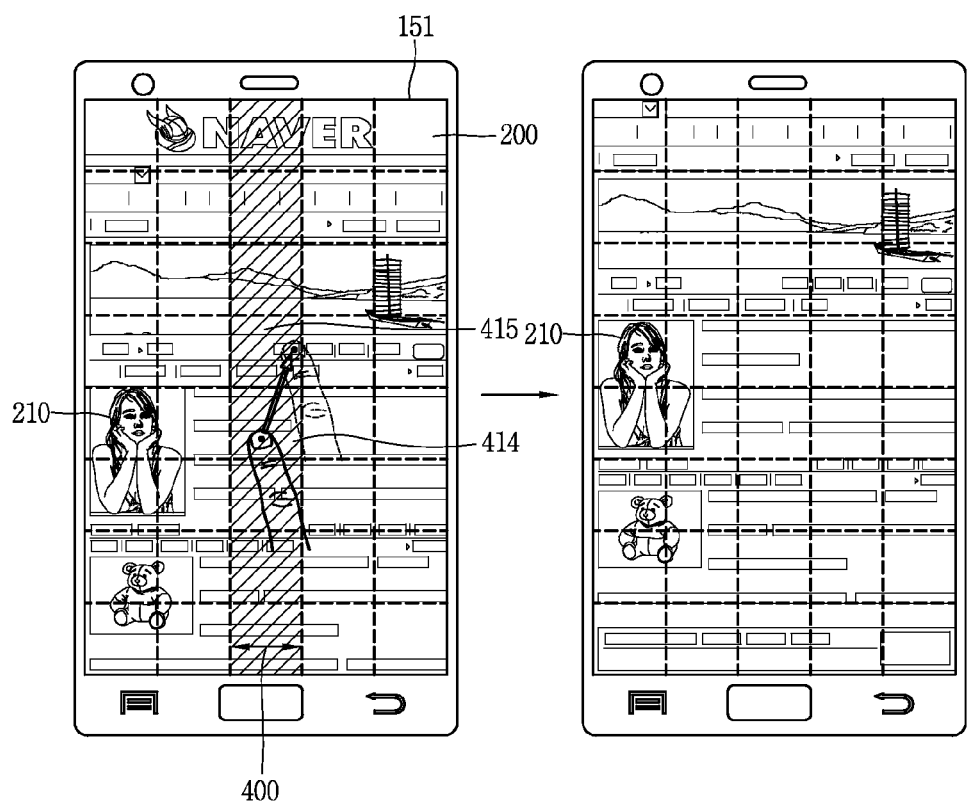
FIGS. 11A and 11B are conceptual views illustrating a method for moving a page in the mobile terminal according to another embodiment disclosed in the present disclosure.
Figure 11B:
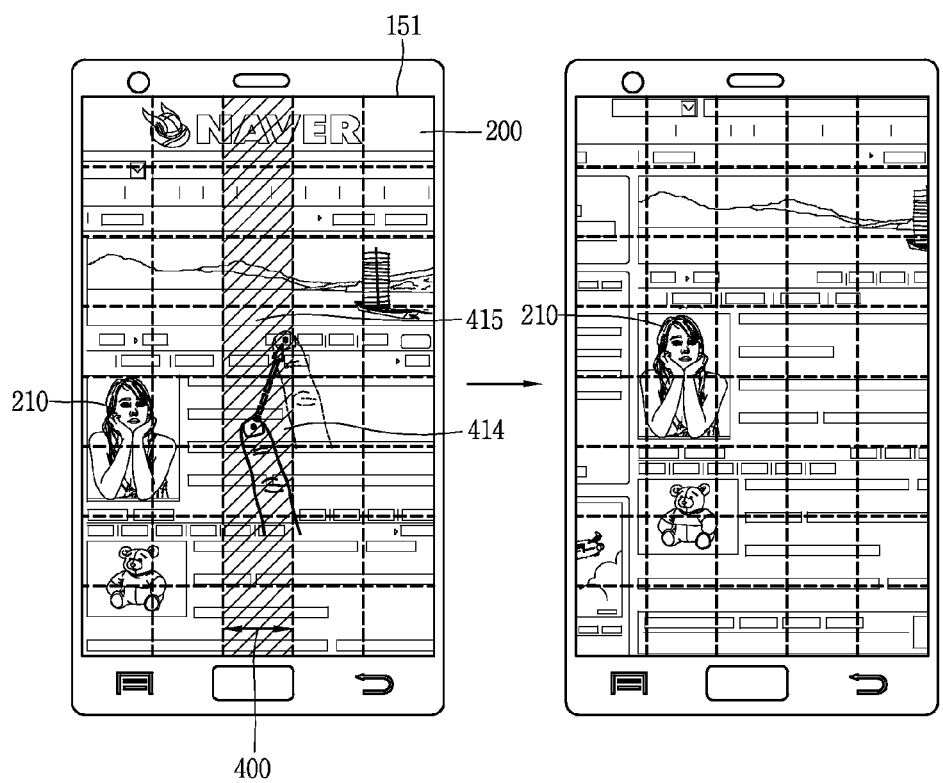

FIGS. 11A and 11B are conceptual views illustrating a method for moving a page in the mobile terminal according to another embodiment disclosed in the present disclosure.

With respect to a movement of an object in the same row, the controller 180 may move a page in a different direction according to a speed of a movement of the object.

For example, as illustrated in FIG. 11A, when the object moves obliquely from the unit cell 414 to the unit cell 415 adjacent to the unit cell 414 within the first row 400, the controller 180 determines a speed of the movement of the object.

According to the determination result, when the speed of the movement of the object is equal to or higher than a pre-set reference, the controller 180 determines that the movement of the object as a movement for scrolling the page 200 in a vertical direction and moves the page 200 in only one direction (vertical direction), regardless of the oblique movement.

Similarly, as illustrated in FIG. 11B, when the object moves obliquely from the unit cell 414 to the unit cell 415 adjacent to the unit cell 414 within the first row 400, the controller 180 determines a speed of the movement of the object.

According to the determination result, when the speed of the movement of the object is lower than the pre-set reference, the controller 180 determines the movement of the object, as a movement for minutely moving the page 200, and moves the page 200 in a right diagonal direction according to the movement of the object.

As discussed above, in the mobile terminal according to an embodiment disclosed in the present disclosure, a screen displayed on the display unit may be moved upon recognizing a user intention.

Hereinafter, a method for activating the scroll mode based on the number of objects sensed on the display unit and an interval between objects, rather than based on a movement of an object sensed within a reference region and a reference row as mentioned above will be described.

Figure 12:
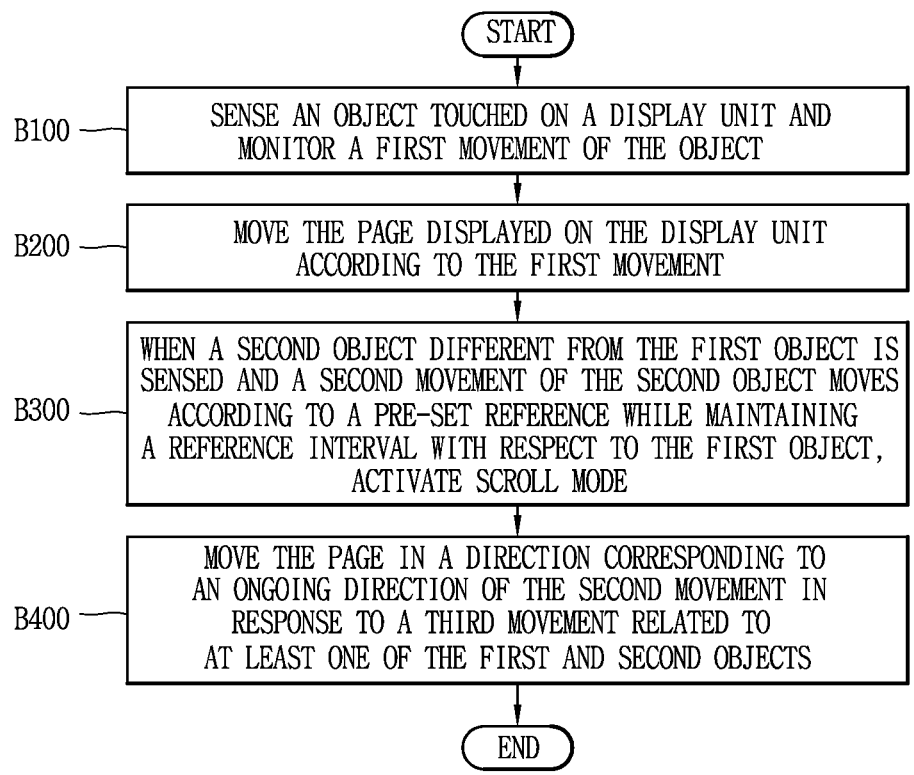
FIG. 12 is a flow chart illustrating a control method of a mobile terminal according to another embodiment disclosed in the present disclosure.

FIG. 12 is a flow chart illustrating a control method of a mobile terminal according to another embodiment disclosed in the present disclosure, FIG. 13 is a conceptual view illustrating a method for entering a scroll mode in the mobile terminal according to another embodiment disclosed in the present disclosure.

First, when a first object is touched on the display unit 151, the sensing unit 140 monitors a first movement of the first object (B100).

The controller 180 moves a page displayed on the display unit 151 in response to the first movement (B200).

For example, as illustrated in FIG. 13(*a*), when a first object 410 moves in a right upward direction, the controller 180 moves the page 200 in the right upward direction to correspond to the movement direction of the first object 410 as illustrated in FIG. 13(*b*).

The controller 180 determines whether or not a second object different from the first object is sensed on the display unit 151 and whether or not a second movement corresponding to the second object moves while maintaining a reference interval with the first object (B300).

For example, as illustrated in FIG. 13(*b*), when a second object 420 different from the first object 410 is sensed on the display unit 151 and any one of the first and second objects moves, the controller 180 determines whether or not an interval between the first and second objects in the direction perpendicular to the movement direction is continuously maintained within the reference interval.

FIG. 13(*b*) illustrates that the first and second objects 410 and 420 move simultaneously, but only any one of the first and second objects 410 and 420 may move.

Meanwhile, when the movement in relation to the first and second objects 410 and 420 moves, while satisfying a pre-set reference, the controller 180 activates the scroll mode.

Here, the pre-set reference may be variously set. Namely, the pre-set reference may include i) when the first and second objects 410 and 420 move by a pre-set length or greater, ii) when the first and second objects 410 and 420 move by the pre-set length or greater and at a pre-set speed or higher, and iii) when the first and second objects 410 and 420 move at the pre-set speed or higher, while maintaining a pre-set reference interval therebetween, and the like.

As discussed above, in step B300 of FIG. 12, when a second movement in relation to the first object and the second object moves, while maintaining the reference interval, the controller 180 activates the scroll mode and moves the page in only a direction set in the scroll mode, in response to at least one movement of the first and second objects 410 and 420 (B400).

Here, the direction set in the scroll mode is a direction corresponding to the second movement of the first and second objects 410 and 420.

For example, referring to FIG. 13(*b*) in which a movement for activating the scroll mode is illustrated, since the first and second objects 410 and 420 move in the vertical direction, the direction for moving the page in the scroll mode is set to be the 'vertical direction'.

In the scroll mode, as illustrated in FIG. 13(*c*), although the first and second objects 410 and 420 move from the vertical direction to the right diagonal vertical direction, the controller 180 may move the page 200 in only the vertical direction as shown in FIG. 13(*d*).

As discussed above, in the mobile terminal according to an embodiment disclosed in the present disclosure, the scroll mode can be activated by using a multi-touch, and as the scroll mode is activated, a page can be moved according to a user intention, regardless of a touch direction.

Meanwhile, in the mobile terminal according to an embodiment disclosed in the present disclosure, a page displayed on the display unit is moved in response to a user's touch input with respect to the display unit, namely, a movement of an object touched on the display unit.

Also, while the page is being moved in response to the movement of the object, when the page arrives at the edge thereof, a shape of the page is changed and information regarding the edge of the page may be output, in order to inform the user that the page cannot be moved any further in the mobile terminal.

Hereinafter, a method for displaying information regarding the edge of a page will be described in detail with reference to the accompanying drawings.

FIGS. 14A, 14B, 14C, and 14D are conceptual views illustrating a method for displaying an edge of a page in the mobile terminal according to an embodiment disclosed in the present disclosure.

The controller 180 (See FIG. 1) may change the shape of the page in various manners in order to indicate that the page cannot be moved any further or cannot be reduced or magnified according to user's touch input.

Figure 14A:
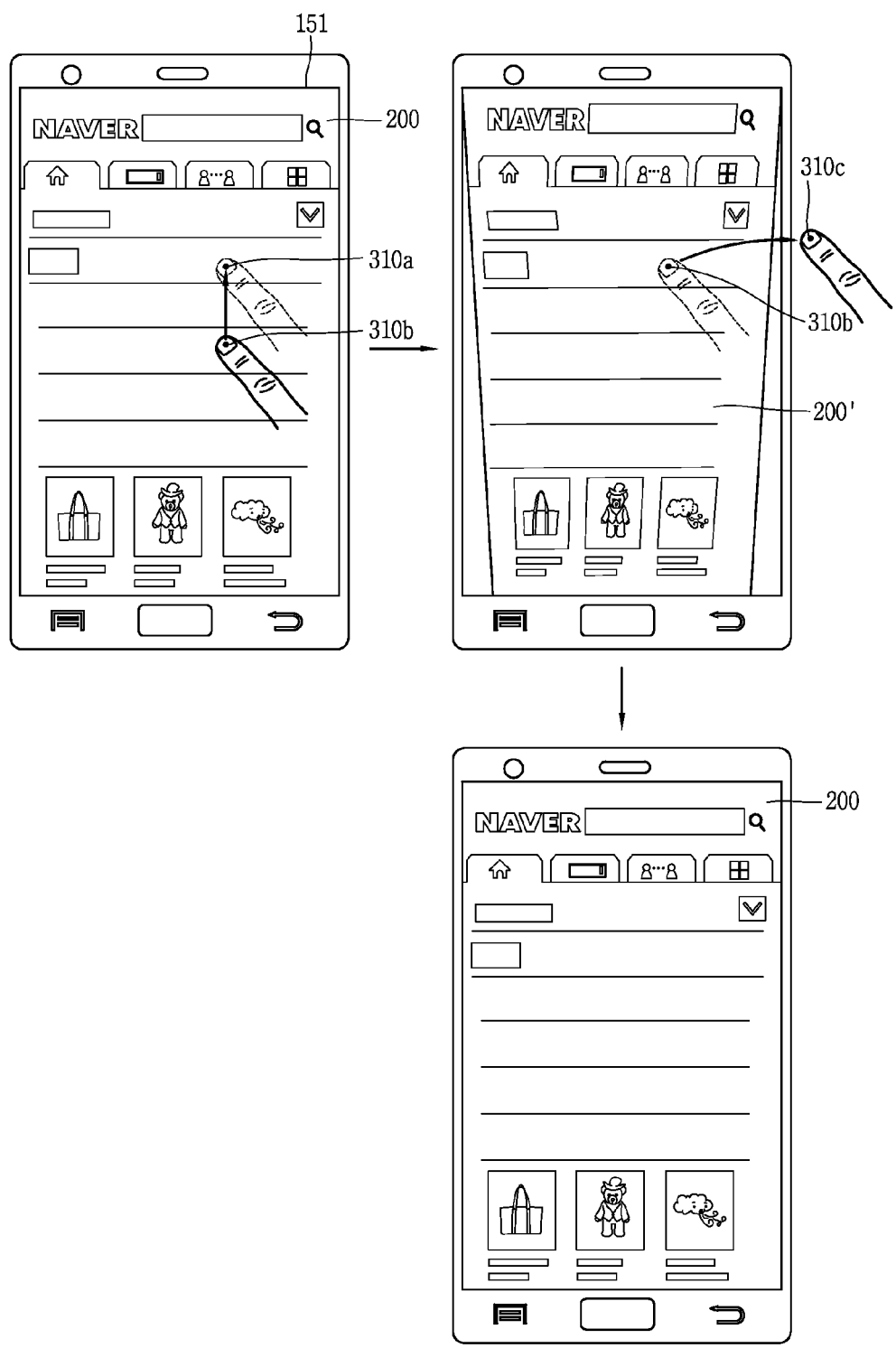
FIGS. 14A, 14B, 14C, and 14D are conceptual views illustrating a method for displaying an edge of a page in the mobile terminal according to an embodiment disclosed in the present disclosure.

First, as illustrated in FIG. 14A, the page 200 displayed on the display unit 151 is moved according to a user's touch input, and in a state in which the page 200 cannot be moved any further, when the user's touch input is continuously applied, the controller 180 may change the shape of the page 200.

Also, the controller 180 may change the shape of the page according to a direction of the user's touch input.

For example, the user's touch input is input in a vertical direction and in a state in which the page cannot be moved any further, when the page is dragged from the first point 310a to the second point 310b, the controller 180 tilts the shape of a page 200' to correspond to the direction of dragging from the first point 310a to the second point 310b.

Thus, the page 200' having a changed shape and a region 210 lying beyond the edge of the page 200' are displayed on the display unit 151.

In this case, the controller 180 may display the page 200' tilt to have 3D effect.

In the state in which the shape of the page 200' is tilt, when the user's touch input is released (310b→310c), the controller 180 restores the page 200' to have the original shape (200'→200).

Figure 14B:
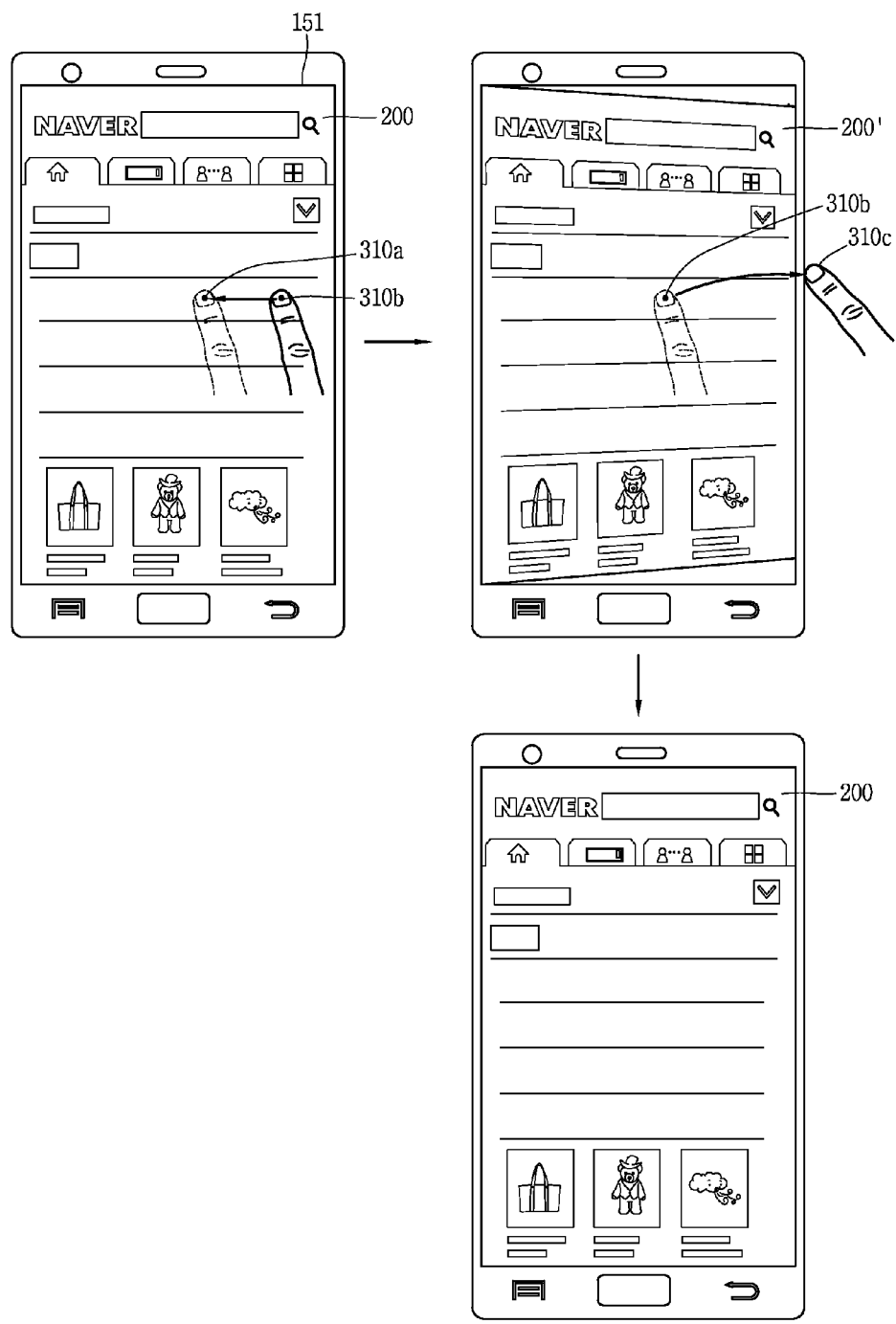

Also, as illustrated in FIG. 14B, in a state in which the page cannot be moved any further in the horizontal direction, when a user's touch input is applied in the horizontal direction (310a→310b), the controller 180 may change the shape of the page 200' such that the page is tilt in the horizontal direction.

In the state in which the shape of the page 200' is tilt, when the user's touch input is released (310b→310c), the controller 180 restores the page 200' to have the original shape (200'→200).

Figure 14C:
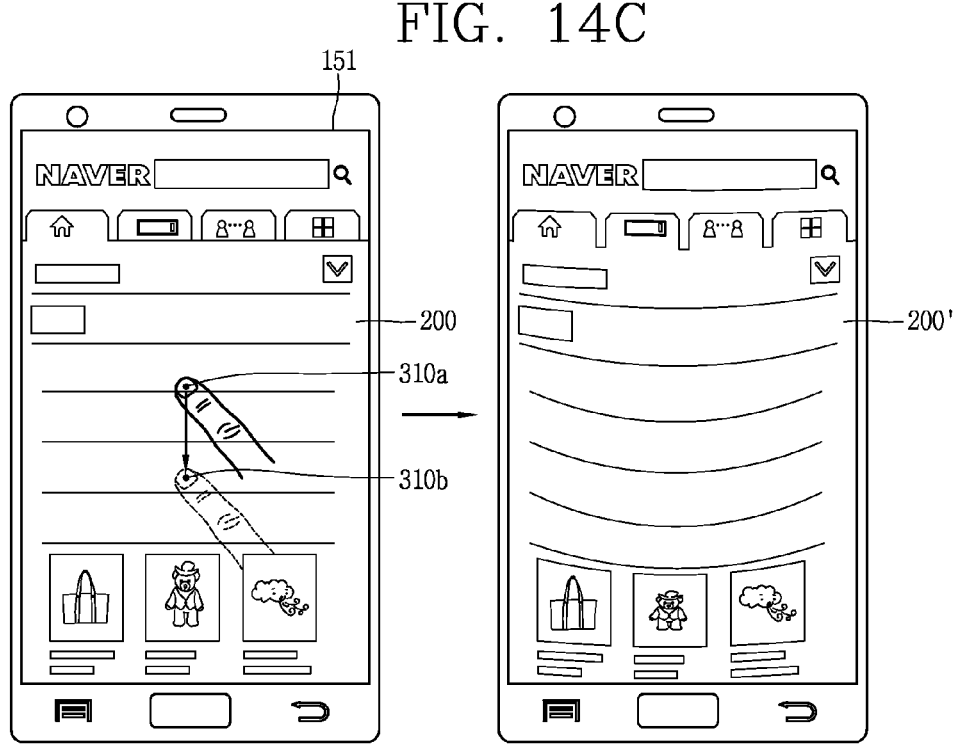
Figure 14D:
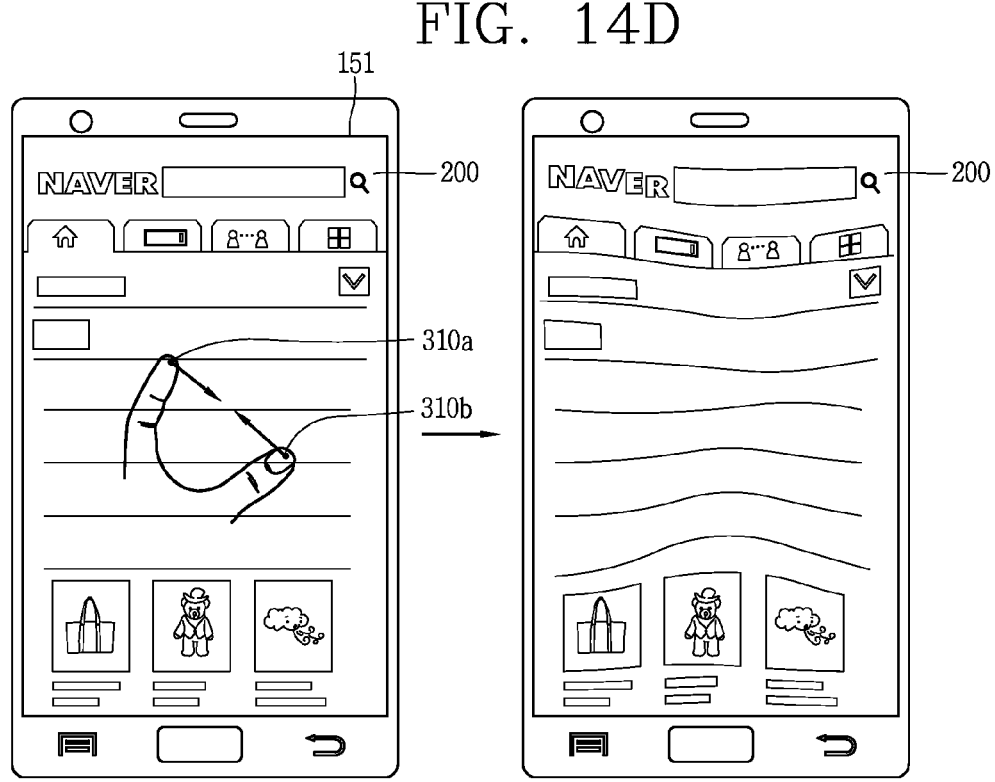

Also, as illustrated in FIGS. 14C and 14D, besides tilting of the page 200, the controller 180 may increase or decrease the page in a direction (310a→310b) corresponding to the user's touch input. In this case, only text included in the page may be discriminately deformed or the page may be deformed overall.

As discussed above, in the mobile terminal according to an embodiment disclosed in the present disclosure, a shape of a page may be changed in order to inform the user that the page cannot be moved any further, or a shape of a page may be changed to correspond to a movement direction of the page in order to provide information regarding the movement direction of the current page.

Hereinafter, a method for displaying data in a region beyond the edge of the page due to a change in a shape of a page will be described with reference to FIG. 15.

Figure 15:
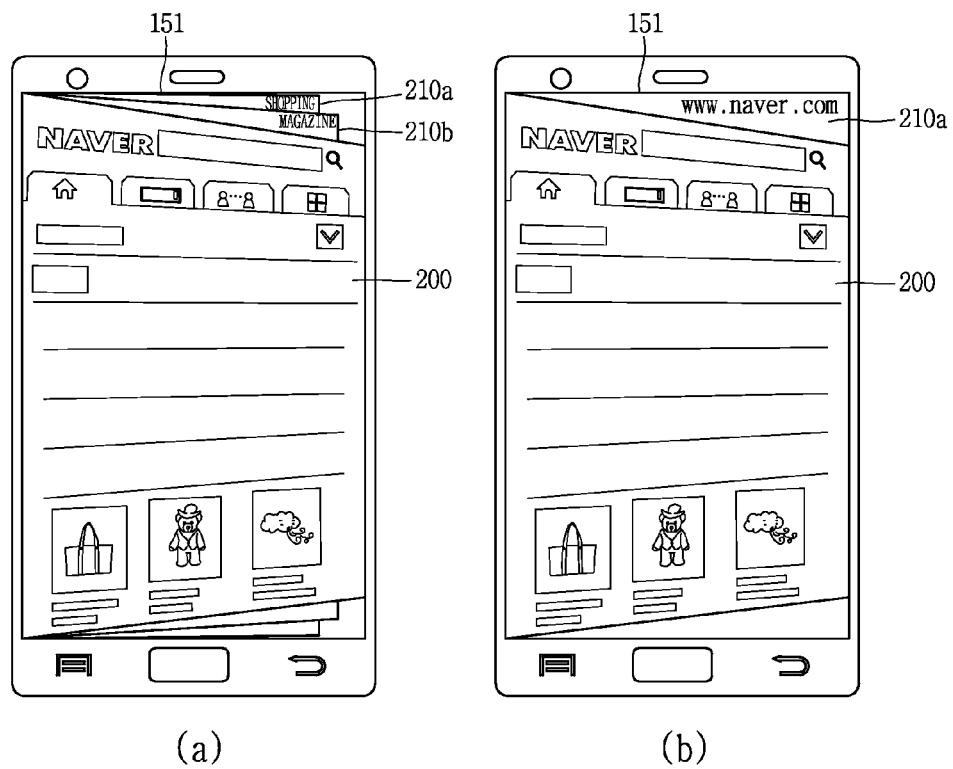
FIG. 15 is a conceptual view illustrating a method for displaying information in a region beyond a page in the mobile terminal according to an embodiment disclosed in the present disclosure.

FIG. 15 is a conceptual view illustrating a method for displaying information in a region beyond a page in the mobile terminal according to an embodiment disclosed in the present disclosure.

When the page 200 cannot be moved any further in response to a user's touch input, the controller 180 may indicate that the page cannot be moved any further by displaying a visual effect that the page 200 is tilt.

Also, when an empty space (or the first region 210) is formed in a region beyond the edge of the page according to tilting of the page 200, the controller 180 may display various types of information such as information regarding the page 200, information regarding an activated application, information regarding an activated Web page, and the like, in the first region 210.

For example, as shown in FIG. 15(a), the number of activated Web pages may be visually displayed by using the shapes of bookmarks 201a and 210b in the first region 210, and information regarding Web pages may be displayed in the shapes of the bookmarks 210a and 210b.

Also, as illustrated in FIG. 15(b), when the page 200 is a Web page, an address of a Web page may be output to the first region 210.

As discussed above, in the mobile terminal according to an embodiment disclosed in the present disclosure, information regarding the edge of a page can be provided, and at the same time, information regarding a state and a page of the terminal can be provided.

Also, in the mobile terminal according to an embodiment disclosed in the present disclosure, when a page is magnified or reduced according to a user's touch input, information regarding a state in which a page cannot be reduced or increased any further can be provided.

Figure 16A:
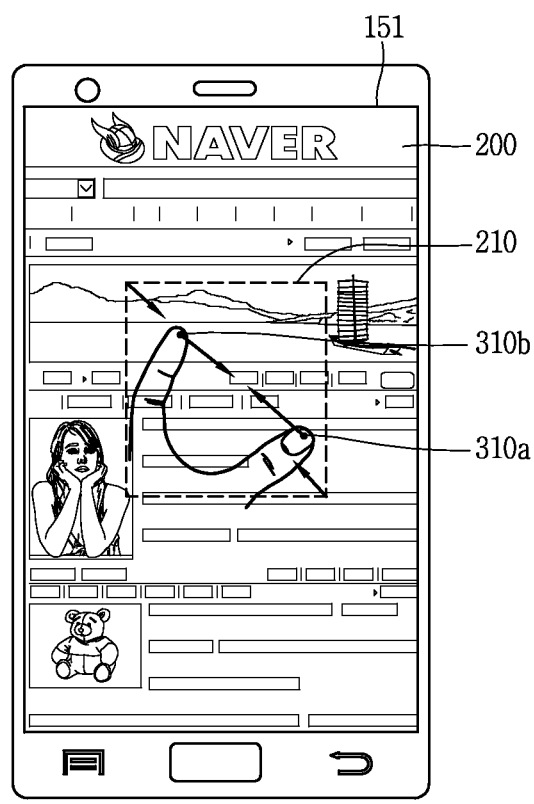
FIGS. 16A, 16B, and 16C are conceptual views illustrating a method for displaying information regarding reduction or magnification of a page in the mobile terminal according to an embodiment disclosed in the present disclosure.
Figure 16B:
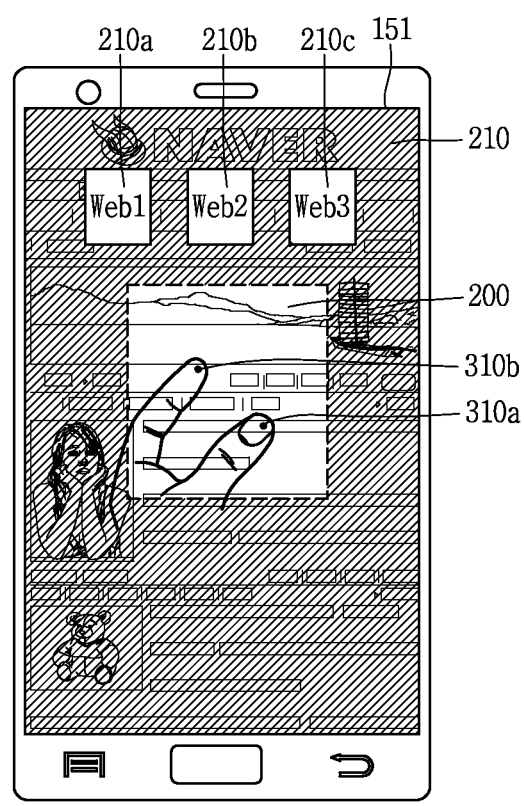
Figure 16C:
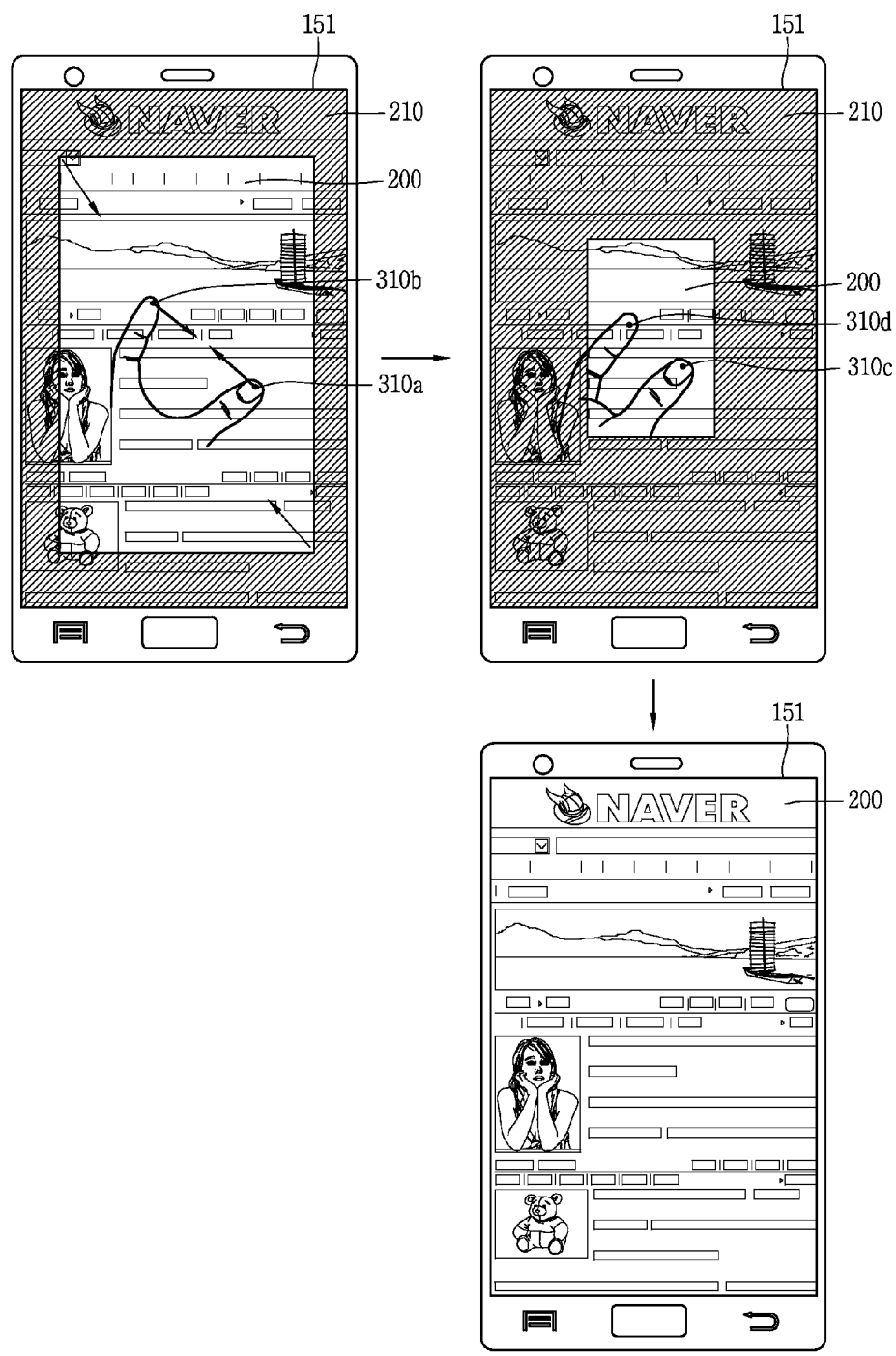

FIGS. 16A, 16B, and 16C are conceptual views illustrating a method for displaying information regarding reduction or magnification of a page in the mobile terminal according to an embodiment disclosed in the present disclosure.

First, as illustrated in FIG. 16A, when the page 200 cannot be reduced any further, the controller 180 (See FIG. 1) may display a guide image 210 in response to user's touch inputs 310a and 310b for reducing the page 200.

The controller 180 may continuously diminish and display the guide image 210 in response to the user's touch input, in order to indicate that the terminal is reacting to the user's touch input.

Also, the controller 180 may display an arrow image, or the like, in a direction corresponding to the touch input in the vicinity of the guide image 210, in order to indicate that the terminal is reacting to the user's touch input.

Also, as illustrated in FIG. 16B, when the page 200 cannot be reduced any further, the controller 200 may display the guide region 210 in response to the user's touch inputs 310a and 310b for reducing the page 200. The controller 180 may display the guide region 210 such that it is discriminated from the page 200 by using a shadow or a color selected by the user or the controller.

Also, the controller 180 may display function icons 210a, 210b, and 210c for changing to different functions on the guide region 210. In a state in which the touches 310a and 310b are maintained, the user may touch the function icons 210a, 210b, and 210c by using a different touch object to display a page different from the page 200 currently displayed on the display unit 151.

Also, in the state in which the guide region 200 is formed, when the users' touches 310a and 310b are released, the controller 180 may maintain displaying of the guide region and the function icons 210a, 210b, and 210c. In this case, when the page 200 part, other than the guide region 210, is touched by the user, the controller 180 may make the guide region 210 disappear.

Also, as shown in FIG. 16C, in response to the user's touch input for reducing the page, the controller 180 may continuously diminish the guide region 210.

Also, as in the embodiment in relation to the reduction of the page as discussed above, with respect to a touch input for magnifying a page, the controller 180 may gradually magnify the guide image or the guide region in order to inform the user that the terminal is reacting to the user's touch input.

As discussed above, in the mobile terminal according to an embodiment of the present invention, with respect to a user's touch input to the display unit, a fact that the terminal is reacting to the touch input can be indicated by outputting an image or by converting an output image.

Also, in the mobile terminal and the control method thereof according to an embodiment of the present invention, by recognizing a user intention with respect to a direction in which a page displayed on the display unit is to be moved from a touch direction of a first touch input by the user, although a second touch input in a direction different from that of the first touch input is applied, a page can be moved in a direction according to a user intention.

Also, in the mobile terminal and the control method thereof according to an embodiment of the present invention, while a page output to the display unit is being moved, when a page arrives at the edge thereof, a shape of the page is changed in order to provide intuitional information indicating that the page cannot be moved any further, to the user.

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal including a display unit configured to receive a touch input, the mobile terminal comprising:
   a sensing unit configured to sense an object touching the display unit; and
   a controller configured to:
   move a page displayed on the display unit in a first direction corresponding to a first ongoing direction of a first movement of the object on the display unit; and
   continue moving the page in the first direction when a second movement of the object in a second ongoing direction is detected within a reference region that includes a starting point of the first movement, following the first movement of the object within the reference region, such that the page is moved in the first direction regardless of whether the second ongoing direction of the second movement is same as or different from the first ongoing direction of the first movement.

2. The mobile terminal of claim 1, wherein when the first movement is performed within the reference region, the controller is further configured to activate a scroll mode such that the page displayed on the display unit is moved only in the first direction during the scroll mode in response to the second movement of the object that is continued from the first movement.

3. The mobile terminal of claim 2, wherein when the scroll mode is activated, the controller is further configured to move the page displayed on the display unit in the first direction even when the second movement moves out of the reference region.

4. The mobile terminal of claim 2, wherein the scroll mode is released when the object no longer touches the display unit.

5. The mobile terminal of claim 1, wherein the first ongoing direction is a horizontal direction, a vertical direction, or a diagonal direction of the page.

6. The mobile terminal of claim 1, wherein:
   the first movement of the object generates a drag input for moving the page displayed on the display unit;
   when the first movement is performed within the reference region and a speed of the first movement is equal to or higher than a reference speed, the controller is further configured to move the page displayed on the display unit along the reference region in response to the first movement; and
   when the first movement is performed within the reference region and a speed of the first movement is lower than the reference speed, the controller is further configured to move the page displayed on the display unit in a direction of the drag input in response to the first movement.

7. The mobile terminal of claim 6, wherein the first ongoing direction is a direction that is in parallel with a direction of a length of the reference region.

8. The mobile terminal of claim 1, wherein the first movement performed within the reference region is affected by at least a number of touch events occurring during the first movement, a reference speed, or a reference time.

9. The mobile terminal of claim 1, wherein:
   the controller is further configured to move the page displayed on the display unit in response to a movement of the object on the display unit; and
   when an edge of the page is reached in response to the movement of the object and the page cannot be moved further, the controller is further configured to change a shape of the page such that the page is displayed in a different shape.

10. The mobile terminal of claim 9, wherein the controller is further configured to tilt the page displayed on the display unit when the edge of the page is reached such that at least one other page is partially displayed when the page is tilted.

11. The mobile terminal of claim 10, wherein the at least one other page comprises a plurality of different activated pages and at least a number of the different activated pages and information regarding content of the different pages are displayed when the page is tilted.

12. The mobile terminal of claim 9, wherein the changed shape of the page is restored to a previous shape when the object no longer touches the display unit.

13. The mobile terminal of claim 1, wherein the reference region is set based on a point on the display unit where the object is touched.

14. The mobile terminal of claim 13, wherein the reference region is set differently based on whether the object moves horizontally or vertically.

15. The mobile terminal of claim 1, wherein the reference region is a preset fixed region on the display unit.

16. A mobile terminal including a display unit including a plurality of unit cells and configured to receive a touch input, the mobile terminal comprising:
   a sensing unit configured to sense an object touching the display unit; and
   a controller configured to:
   move a page displayed on the display unit in response to a first movement of the object on the display unit, the first movement originated at a first unit cell of the plurality of unit cells and completed at a second unit cell of the plurality of unit cells such that the first movement is performed within a row including the first unit cell and the second unit cell and the page is moved in a direction of the row;
   continue moving the page displayed on the display unit in a direction of the row in response to a second movement of the object following the first movement performed within the row regardless of whether a direction of the second movement is same as or different from the direction of the row.

17. The mobile terminal of claim 16, wherein the controller is further configured to move the page in the direction of the row in response to the second movement even when the object moves out of the row during the second movement.

18. The mobile terminal of claim 17, wherein the controller is further configured to move the page in an upward or downward direction or in a leftward or rightward direction based on the direction of the row according to an ongoing direction of the second movement.

19. The mobile terminal of claim 16, wherein the first movement which is performed in the direction of the row is affected by a number of unit cells that are touched by the object within the row.

20. The mobile terminal of claim 16, wherein the first movement generates a drag input for moving the page displayed on the display unit, and the controller is further configured to move the page according to a direction of the drag input.

21. The mobile terminal of claim 20, wherein the controller is further configured to move the page in the direction of the row in response to the first movement when a speed of the first movement is equal to or higher than a reference speed.

22. The mobile terminal of claim 16, wherein a size of each of the plurality of unit cells is changed according to a user setting.

23. A method for controlling a mobile terminal including a display unit configured to receive a touch input, the method comprising:

sensing an object touching the display unit;

moving a page displayed on the display unit in a first direction corresponding to a first ongoing direction of a first movement of the object on the display unit; and continuing moving the page in the first direction when a second movement of the object in a second ongoing direction is detected within a reference region that includes a starting point of the first movement, following the first movement of the object within the reference region, such that the page is moved in the first direction regardless of whether the second ongoing direction of the second movement is same as or different from the first ongoing direction of the first movement.

\* \* \* \* \*